(12) United States Patent
Tomay et al.

(10) Patent No.: US 9,407,722 B2
(45) Date of Patent: Aug. 2, 2016

(54) SCHEDULED DEVICE COMMUNICATION

(71) Applicant: Amazon Technologies, Inc., Reno, NV (US)

(72) Inventors: Beryl Tomay, Newcastle, WA (US); Valient I. Gough, Seattle, WA (US); Christopher S. A. MacGregor, Seattle, WA (US); Kenneth P. Kiraly, Menlo Park, CA (US); Sailesh Rachabathuni, Santa Clara, CA (US); David Berbessou, Sunnyvale, CA (US)

(73) Assignee: Amazon Technologies, Inc., Reno, NV (US)

(*) Notice: Subject to any disclaimer, the term of this patent is extended or adjusted under 35 U.S.C. 154(b) by 0 days.

(21) Appl. No.: 14/459,133

(22) Filed: Aug. 13, 2014

(65) Prior Publication Data
US 2014/0365617 A1    Dec. 11, 2014

Related U.S. Application Data

(62) Division of application No. 12/860,853, filed on Aug. 20, 2010, now Pat. No. 8,867,401.

(51) Int. Cl.
*H04L 29/08*    (2006.01)
*H04N 21/258*    (2011.01)
*H04N 21/262*    (2011.01)
*H04N 21/6543*    (2011.01)

(52) U.S. Cl.
CPC ........ *H04L 67/325* (2013.01); *H04N 21/25808* (2013.01); *H04N 21/26216* (2013.01); *H04N 21/6543* (2013.01)

(58) Field of Classification Search
CPC .............. H04L 67/325; H04L 21/2368; H04L 21/4341; H04L 21/64322
USPC .......... 370/431, 228, 465, 352; 709/219, 203, 709/217, 221; 725/46, 44, 38, 110, 39, 97, 725/98; 705/7.13, 26.8, 27.1
See application file for complete search history.

(56) References Cited

U.S. PATENT DOCUMENTS

| | | | |
|---|---|---|---|
| 6,832,239 B1 | 12/2004 | Kraft et al. | |
| 7,668,201 B2* | 2/2010 | Sharony et al. | 370/468 |
| 7,788,339 B1 | 8/2010 | Srinivasan | |
| 2001/0003828 A1* | 6/2001 | Peterson et al. | 709/219 |
| 2002/0069271 A1 | 6/2002 | Tindal et al. | |
| 2003/0093547 A1* | 5/2003 | Scheessele | H04L 29/06 709/231 |
| 2007/0174873 A1* | 7/2007 | Griggs | 725/46 |
| 2007/0198468 A1* | 8/2007 | Berger | 707/2 |
| 2008/0192820 A1* | 8/2008 | Brooks et al. | 375/240.02 |
| 2008/0288460 A1 | 11/2008 | Poniatowski et al. | |
| 2009/0031345 A1 | 1/2009 | Vagnati | |
| 2009/0271611 A1* | 10/2009 | Roll | 713/150 |
| 2011/0087602 A1 | 4/2011 | Rutman | |

OTHER PUBLICATIONS

USPTO Non-Final Office Action for U.S. Appl. No. 12/860,853 mailed Sep. 19, 2012.

(Continued)

*Primary Examiner* — Jamal Javaid
(74) *Attorney, Agent, or Firm* — Lowenstein Sandler LLP

(57) ABSTRACT

A processing device receives a schedule from a server, the schedule identifying delivery times for a set of items associated with the user device. At each delivery time, the processing device contacts the server to obtain one or more items from the server in accordance with the schedule.

17 Claims, 20 Drawing Sheets

(56) References Cited

OTHER PUBLICATIONS

USPTO Final Office Action for U.S. Appl. No. 12/860,853 mailed Feb. 26, 2013.
USPTO Non-Final Office Action for U.S. Appl. No. 12/860,853 mailed Jun. 18, 2013.
USPTO Final Office Action for U.S. Appl. No. 12/860,853 mailed Nov. 26, 2013.
USPTO Notice of Allowance for U.S. Appl. No. 12/860,853 mailed May 27, 2014.

* cited by examiner

SCHEDULED DEVICE COMMUNICATION

CROSS-REFERENCE TO RELATED APPLICATIONS

This application is divisional of U.S. patent application Ser. No. 12/860,853, filed on Aug. 20, 2010, which is hereby incorporated by reference.

BACKGROUND

A large and growing population of users is enjoying entertainment through the consumption of digital media items, such as music, movies, images, electronic books, and so on. The users employ various electronic devices to consume such media items. Among these electronic devices are electronic book readers, cellular telephones, personal digital assistants (PDAs), portable media players, tablet computers, netbooks, and the like. As the quantity of available electronic media content continues to grow and user devices to consume that media content continue to proliferate, finding inexpensive and effective ways to provide timely delivery of digital media items (e.g., newspapers, magazines, pre-ordered books, pre-ordered articles, book club materials, news feeds, blog feeds, etc.) to user devices continues to be a priority.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Methods and systems for scheduling communications between an item providing system and user devices are described. A user device may be any computing device that can connect to a network. Examples of such user devices include electronic book readers, cellular telephones, personal digital assistants (PDAs), portable media players, tablet computers, netbooks, and the like. A user device may connect to a network to obtain items from an item providing system or to perform other activities. Items may include content items, software updates, instructions (e.g., instructions to download content items), or any other data items for which predictable delivery is observable. Content items may include subscription materials (e.g., newspapers, magazines, news feeds, blog feeds, subscribed audio or video content such as podcasts) or non-subscription materials that can be ordered in advance (e.g., book club books, rental books, pre-ordered books, pre-ordered articles, pre-ordered audio books or articles, music albums, pre-ordered television episodes of a show, pre-ordered movies).

In one embodiment, an item providing system identifies a set of items associated with each user device (e.g., items to be delivered to a user device at predictable times). In one embodiment, the item providing system determines when items become available for delivery to user devices, and creates a schedule for each user device based on the set of items associated with that user device. The item providing system then allows each user device to obtain the items in accordance with a corresponding schedule. In particular, in one embodiment, the item providing system provides a schedule to a user device, and places the set of items available for delivery in a queue. At the times specified in the schedule, the user device connects to the item providing system to obtain the items placed in the queue.

Accordingly, a convenient mechanism is provided that automatically generates schedules for user devices and allows these user devices to wake up at the scheduled times and connect to a server to download the corresponding items. By allowing user devices to initiate the download of the items, the server no longer needs to send notifications (e.g., IP notifications or SMS messages) to user devices when an item is ready to be delivered. This significantly reduces the cost associated with the distribution of items to user devices, and provides an effective distribution mechanism for user devices that do not have SMS capability (e.g., WiFi-only devices) and are not on a WiFi network where IP notifications are able to get through, as well as SMS-capable user devices located in the areas that do not have SMS coverage. Embodiments of the invention may also ensure that user devices do not miss a download time due to a failed SMS message or IP notification (e.g., if the wireless mode of a user device was turned off at the time of an SMS message or an IP ring).

Figure 1:
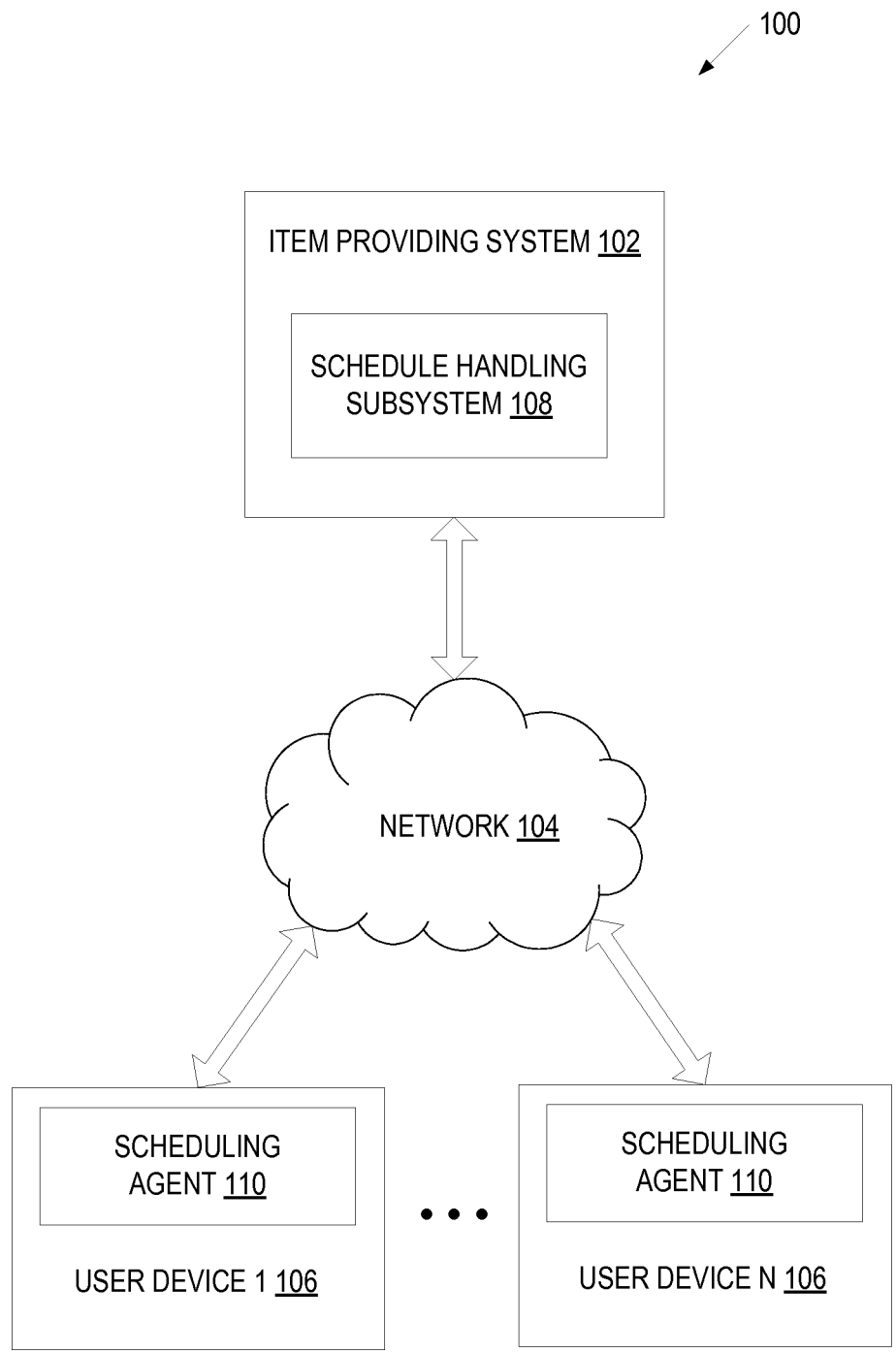
FIG. 1 is a block diagram of an exemplary network architecture in which embodiments of the invention may operate.

FIG. 1 is a block diagram of exemplary network architecture 100 in which embodiments of the invention may operate. The network architecture 100 may include an item providing system 102 and multiple user devices 106 coupled to the item providing system 102 via a network 104 (e.g., a public network such as the Internet, a private network such as a local area network (LAN), or a virtual private network (VPN)).

The user devices 106 are variously configured with different functionality to enable consumption of one or more types of items. As discussed above, the items may be instructions, software updates or any type or format of digital content, including, for example, electronic texts (e.g., eBooks, electronic magazines, digital newspapers, blogs), digital audio (e.g., music, audible books), digital video (e.g., movies, television, short clips), images (e.g., art, photographs), and multimedia content. The user devices 106 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The item providing system 102 provides items, upgrades, and/or other information to the user devices 106 registered with the item providing system 102 via the network 104. The item providing system 102 also receives various requests, instructions and other data from the user devices 106 via the network 104. The item providing system 102 may include one or more machines (e.g., one or more server computer systems, routers, gateways) that have processing and storage capabilities to provide the above functionality.

Communication between the item providing system 102 and a user device 106 may be enabled via any communication infrastructure. One example of such an infrastructure includes a combination of a wide area network (WAN) or a VPN and wireless infrastructure, which allows a user to use the user device 106 to purchase items and consume items without being tethered to the item providing system 102 via hardwired links. The wireless infrastructure may be provided by a wireless carrier system that can be implemented using various data processing equipment, communication towers, etc. Alternatively, or in addition, the wireless carrier system may rely on satellite technology to exchange information with the user device 106. Yet alternatively, or in combination, the wireless infrastructure may be provided by an access point (e.g., WiFi access point) provider system.

The communication infrastructure may also include a communication-enabling system that serves as an intermediary in passing information between the item providing system 102 and the wireless carrier. The communication-enabling system may communicate with the wireless carrier via a dedicated channel, and may communicate with the item providing system 102 via a non-dedicated communication mechanism, e.g., a public network such as the Internet.

Users of the user devices 106 can register with the item providing system 102 to receive various items that may include, for example, instructions, software updates and content items. Content items may include subscription materials (e.g., newspapers, magazines, news feeds, blog feeds, subscribed audio or video content such as podcasts) or non-subscription materials that can be ordered in advance (e.g., book club books, rental books, pre-ordered books, pre-ordered articles, pre-ordered audio books or articles, music albums, pre-ordered television episodes of a show, pre-ordered movies).

In one embodiment, the item providing system 102 includes a schedule handling subsystem 108 that manages distribution of schedules to the user devices 106. The schedule handling subsystem 108 identifies a set of items that is to be delivered to, or received from a user device 106 and creates a schedule for the user device 106 based on the set of items associated with that user device. For example, if a user has subscribed to the New York Times with delivery to the user device 106 every weekday morning, the schedule handling subsystem 108 identifies the item (the electronic version of the New York Times) and creates a schedule (e.g., every weekday morning) for the user device 106. The schedule handling system 108 then allows the user device 106 to obtain the items in accordance with a corresponding schedule. In one embodiment, the schedule handling subsystem 108 provides a schedule to a user device 106, and places items in a queue as they become available for delivery to user devices 106. In one embodiment, in which an item includes content provided by an external source, an item becomes available for delivery after the media content has been received from a content provider and processed by the item providing system (e.g., converted into a device-readable format as part of an ingestion phase). In another embodiment, in which an item is created locally at the item providing system (e.g., a log file or a message), an item becomes available for delivery to a user device at any time after the item was created.

In one embodiment, the user devices 106 include a scheduling agent 110 that receives a schedule from the schedule handling subsystem 108 and connects to the item providing system 102 at the times specified in the schedule to obtain the associated items. In an alternative embodiment, some of the user devices 106 do not host a scheduling agent 110. In this alternative embodiment, the schedule handling system stores schedules of user devices 106 without a scheduling agent 110 in a local store of the item providing system 102. The schedule handling system 108 then sends delivery notifications (e.g., via an IP notification or an SMS message) to user devices at the delivery times specified in corresponding schedules. Upon receiving a delivery notification, a user device 106 connects to the item providing system 102 to obtain the corresponding items that are held in the queue. An IP notification is a notification message sent to a user device by the item providing system using an Internet protocol such as the Transmission Control Protocol (TCP) or the User Datagram Protocol (UDP).

As will be discussed in more detail below, the schedule handling subsystem 110 and the scheduling agent 108 can provide other features that further facilitate efficient and timely distribution of items to user devices 106.

Figure 2A:
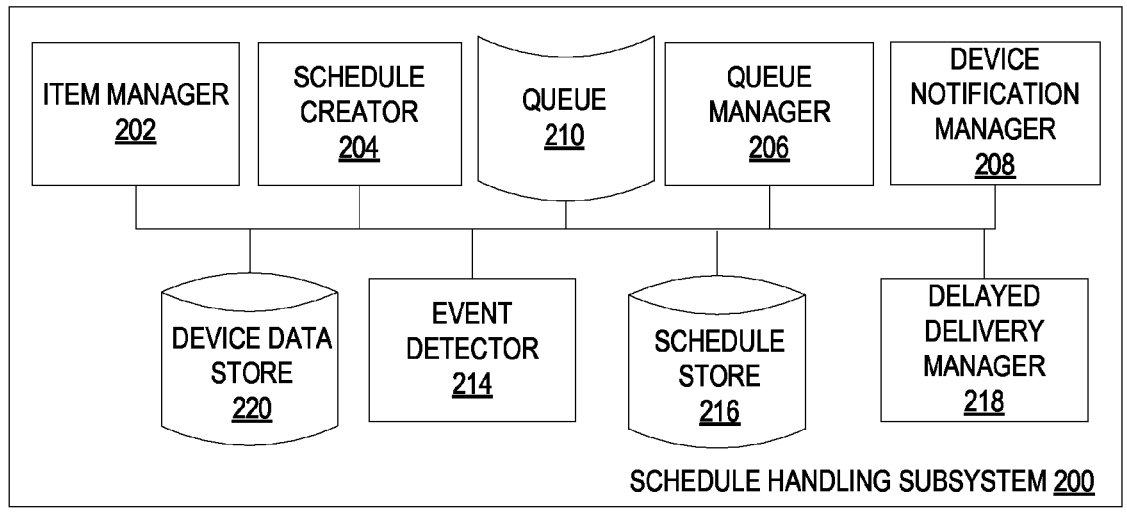
FIG. 2A is a block diagram of one embodiment of a schedule handling subsystem.

FIG. 2A is a block diagram of one embodiment of a schedule handling subsystem 200. The schedule handling subsystem 200 may be the same as the schedule handling subsystem 110 of FIG. 1. In one embodiment, the schedule handling subsystem 200 includes an item manager 202, a schedule creator 204, a queue manager 206, a device notification manager 208, an event detector 214, a delayed delivery manager 218, a device data store 220, a queue 210, and a schedule store 216. The components of the schedule handling subsystem 200 may represent modules that can be combined together or separated into further modules, according to some embodiments.

The item manager 202 maintains information about different items that are currently available to users of the item providing system 102. This item information may be stored in the schedule store 216. For items that include content received from content providers (e.g., subscribed content), the item information may include the name of an item, a time when the item is scheduled to be received from a content provider (e.g., The New York Times, The Boston Globe, The Chicago Tribune, The New Yorker and so on), frequency of the delivery (e.g., daily, weekly, monthly, weekends, weekdays and the like), an ingestion window (e.g., 1 hour) during which the item received from a content provider will be processed by the item providing system 102 (e.g., converted into a device-readable format or added to an index), and a delivery window during which the item has to be delivered to the user devices. The delivery window corresponds to an interval between the time when an item first becomes available for delivery (delivery time) and the time when the delivery of the item to user devices has to be completed (e.g., due to a contract with a content provider and/or some other conditions). For items that are created at the item providing system (e.g., log files), the item information may include the name of an item, the time when the item becomes available for delivery to user devices, frequency of the delivery, and a delivery window during which the item has to be delivered to the user devices. When new items (e.g., new subscriptions) become available, the item manager 202 adds information about the new items to the schedule store 216. Similarly, when information about currently available items changes (e.g., the time when an item is scheduled to be received from a content provider), the item manager 202 updates the information associated with these items accordingly.

The device data store 220 includes information about individual user devices. This information may include, for example, the time zone associated with a user device, whether a user device is configured to initiate communication according to a schedule or it is configured to receive notifications when an item is ready for delivery (i.e., whether a user device hosts a scheduling agent), a user device capability to download items of a particular size and/or type, behavioral characteristics of a device's user (e.g., a user usually turns the device on at 6 am, or a user is usually on an airplane between 6 am and 8 am on Mondays and between 5 pm and 7 pm on Fridays). The event detector 214 receives information about various user devices and stores it in the device data store 220. The behavioral characteristics of a user may be provided by agents hosted by a user device such as an agent monitoring the user's calendar for predefined events (e.g., meetings or flight schedules) or an agent monitoring user email messages for specific email subjects or email senders (e.g., flight reservation confirmations or meeting agendas). Alternatively, this information may be provided by third party websites such as travel planning or reservation websites (e.g., TripIt, Expedia® or Travelocity®). The user device information may include data for new user devices or changes for existing user devices.

The schedule store 216 and the device data store 220 may represent a single data structure or multiple data structures (databases, repositories, files, etc.) residing on one or more mass storage devices, such as magnetic or optical storage based disks, solid-state drives (SSDs) or hard drives.

The schedule creator 204 creates schedules for various user devices using information from the schedule store 216 and the device data store 220. In one embodiment, the schedule creator 204 creates a schedule for a user device by querying the schedule store 216 to identify a set of items associated with the user device and to determine the time when an item becomes available for delivery (delivery time) and a delivery window for each item in the set. The schedule creator 204 may then determine which items in the set have the same or similar delivery times, and create a merged delivery time for such items. For example, if item 1 pertains to The New York Times that delivers content every morning between 4 am and 6 am, item 2 pertains to The Chicago Tribune that delivers content every morning between 5 am and 6:10 am, the ingestion window for each of item 1 and item 2 is 30 minutes, and the user device subscribes to both The New York Times and The Chicago Tribune, then the merged delivery time for items 1 and 2 could be 6:40 am.

Next, the schedule creator 204 can compile a list of delivery times that includes merged delivery times of combined items and original delivery times of the remaining items that cannot be combined with any other items from the set. In one embodiment, the schedule creator 204 uses universal time such as UTC to express delivery times in the schedules. For each delivery time, the schedule creator 204 uses a delivery window to spread the load on the schedule handling subsystem 200 (i.e., to avoid a situation in which various user devices would request items from the queue 210 at the same time). The size of a delivery window may depend on the deadline for completing the delivery of the item to corresponding user devices (delivery deadline) and the number of user devices associated with a particular item. Further, the schedule creator 204 distributes delivery times within the delivery windows for the user device to ensure that different user devices request items from the queue 210 at different times. For example, the schedule creator 204 may distribute delivery times by converting a customer ID associated with the user device into a random number (e.g., using a hash function or some other mechanism), and then mapping this random number to a percentage between 0 percent and 100 percent, where the resulting percentage corresponds to a location within the delivery window. For example, if a delivery window for a subscription is between 5 am and 6 am, and the customer ID of user device 1 is mapped to 20 percent and the customer ID of user device 2 is mapped to 60 percent, then a delivery time for user device 1 will be 5:12 am (5 am+60 minutes*20 percent) and a delivery time for user device 2 will be 5:36 am (5 am+60 minutes*60 percent).

Further, the schedule creator 204 can map the delivery time of each item for the user device to the time zone of the user device. The mapping of the delivery time to the time zone of a user device may be performed to ensure that the user device downloads an item before the delivery deadline of the item in the local time of the user device. For example, if an item provided by The New York Times has to be available to the users by 8 am local time, then a user device in New York has to download the item by 12:00 UTC and a user device in San Francisco has to download the item by 15:00 UTC. In addition, because the usage time of user devices are likely to vary with respect to the UTC time for user devices in different time zones, the schedule creator 204 can schedule an earlier delivery of an item to users who tend to turn on their devices at an earlier UTC time. In the above example, users in New York are likely to turn on their user devices at an earlier UTC time than users in San Francisco; hence the delivery of the item to users in San Francisco can be at a later UTC time than the delivery of the item to users in New York.

In another embodiment, the schedule creator 204 first creates a master schedule for all user devices and then customizes the master schedule for individual user devices. For example, the schedule creator 204 may query the schedule store 216 to identify all items (e.g., all subscriptions) available in the item providing system 102 and determine a delivery time for each of the available items. The schedule creator 204 may then determine which of the available items can be combined, and create a merged delivery time for the combined items. Next, the schedule creator 204 can compile a list of delivery times for all available items with corresponding delivery windows, where the list includes merged delivery times of combined items and delivery times of the remaining items that cannot be combined with any other available items. Further, the schedule creator 204 can create time zone schedules for the available items based on different time zones, and then customize corresponding time zone schedules for individual user devices. In particular, the schedule creator 204 may randomize delivery times within the delivery windows of a time zone schedule for user devices in the relevant time zone, and then remove delivery times of items that were not requested by a user device from the time zone schedule to create a schedule for that user device.

In one embodiment, the schedule creator 204 stores the resulting schedules in the schedule store 216. In another embodiment, the schedule creator 204 sends the resulting schedules to corresponding user devices without storing them locally. In yet another embodiment, the schedule creator 204 stores the resulting schedules in the schedule store 216 and sends the schedules to corresponding user devices.

In one embodiment, the schedule creator 204 adjusts delivery times in a schedule of a user device based on the behavior of the user of the device. For example, if the user usually turns the device on at 6 am in the morning and the first delivery time in the schedule of this user device is also 6 am, the schedule creator 204 may change the first delivery time in the schedule to 5:30 am (if the corresponding item is available for delivery at that time) to "wake" the user device and perform the download before the user turns the device on. Similarly, if the user is usually on an airplane between 6 am and 8 am on Mondays, the schedule creator 204 may change the schedule to ensure that the delivery of morning items on Mondays complete before 6 am if these items are available for delivery before 6 am.

In one embodiment, the queue manager 206 places the schedules created by the schedule creator 204 in the queue 210, and invokes a device notification manager 208 to notify corresponding user devices about their schedules (e.g., via IP notifications or SMS messages). The queue manager 206 also receives various items (e.g., subscribed content items) to be delivered and places these items in the queue for download by corresponding user devices. The queue 210 may be common for all user devices or may include a separate queue for each user device. When a user device connects to the item providing system 102 (at a time specified in its schedule or at some other time) to request its items from the queue, the queue manager 206 retrieves the corresponding items from the queue and provides them to the user device (e.g., for downloading or copying).

In another embodiment, the schedules created by the schedule creator 204 are kept in the schedule store 216. The queue manager 206 receives items to be delivered to user devices, places the items in the queue, and then invokes the device notification manager 208 to notify user devices (e.g., via IP notifications or SMS messages) that the items are ready to be downloaded. When a user device connects to the item providing system 102 in response to a notification, the queue manager 206 retrieves the corresponding items from the queue and provides them to the user device (e.g., for downloading or copying).

The event detector 214 is responsible for detecting events that trigger creation of new schedules or updated schedules and invokes the schedule creator 204 to create a new schedule or to refresh an existing schedule. The creation of a new schedule can be triggered when a user device registers to receive a first item (e.g., a first subscription). The refresh of an existing schedule can be triggered when a user device requests a new item (e.g., a new subscription) to be added to the set of items of this user device or requests one of its items to be removed, when the time zone of the user device is modified, when a delivery time of an existing item is changed, when the behavior of a user of a user device is changed, etc.

In one embodiment, a schedule created for a user device by the schedule creator 204 is a single schedule including download times for all items associated with the user device. Alternatively, the schedule created for the user device may consist of multiple schedules corresponding to predefined time periods (e.g., a morning schedule, an evening schedule, a daily schedule, a weekly schedule, and the like).

The delayed delivery manager 218 is responsible for handling distribution of items that have not been delivered as originally scheduled. In one embodiment, the delayed delivery manager 218 receives a notification from the item manager 202 when a delayed item (e.g., a delayed subscription) is ready for delivery, and notifies corresponding user devices that the delayed item is ready to be downloaded via, for example, an IP notification or an SMS message. In another embodiment, the delayed delivery manager 218 receives a notification of a delayed delivery from the item manager 202, determines a modified delivery time of the delayed item (e.g., based on information provided by the item manager 202), creates a notification with a modified delivery time for relevant user devices, and invokes the queue manager 206 to place the notification in the queue 210. When a user device obtains the notification, the queue manager 206 removes the notification from the queue 210. In yet other embodiments, delayed items are not handled by the delayed item manager 218 but rather a user device itself. That is, a user device may be configured to request an item at a later time if the user device has not obtained this item at a time specified in the schedule.

In one embodiment, the queue manager 206 removes items from the queue after a predetermined time interval. In another embodiment, the queue manager 206 tracks download of the items by a user device, and removes an item from the queue after it was obtained by the user device. In yet another embodiment, in which one queue is maintained for multiple user devices, the queue manager 206 tracks download of an item by various user devices, and removes the item after it was obtained by all corresponding user devices.

Figure 2B:
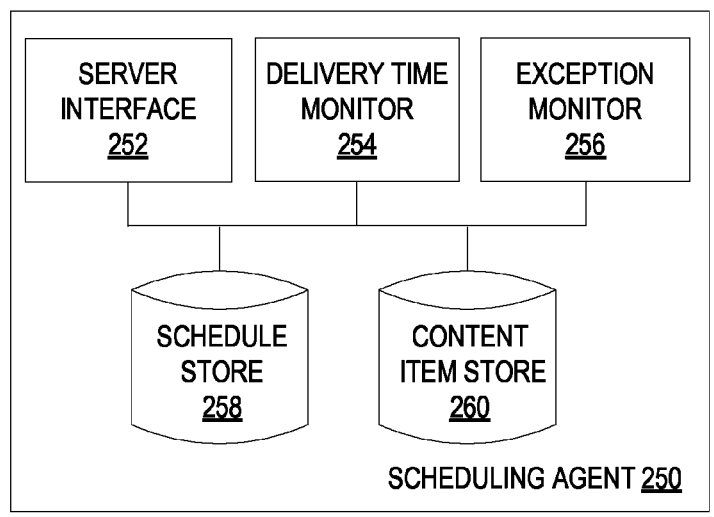
FIG. 2B is a block diagram of one embodiment of a scheduling agent.

FIG. 2B is a block diagram of one embodiment of a scheduling agent 250. The scheduling agent 250 may be the same as scheduling agent 110 of FIG. 1 and may include a server interface 252, a delivery time monitor 254, an exception monitor 256, a schedule store 258 and an item store 260. The components of the scheduling agent 250 may represent modules that can be combined together or separated into further modules, according to some embodiments.

The server interface 252 may receive a notification from the item providing system 102 regarding a new or updated schedule, connect to the item providing system 102 (if not currently connected) to obtain the new or updated schedule, and store this schedule in the schedule store 258. Alternatively, the new or changed schedule may be placed in a queue as a separate item by the schedule handling subsystem 200 and may be obtained by the server interface 252 when obtaining items from the queue. In one embodiment, the item providing system 102 includes one or more times in the schedule that are intended for receiving schedule updates.

The delivery time monitor 254 monitors the current time associated with the user device (e.g., using a timer) to detect when any of the delivery times specified in the schedule take place. One embodiment of a mechanism used to select the next delivery time will be discussed in more detail below in conjunction with FIGS. 10A and 10B. At each delivery time, the delivery time monitor invokes the server interface 252 to connect to the item providing system 102 (if not currently connected) and to obtain items in accordance with the schedule. In one embodiment, the server interface 252 requests specific items as specified in the schedule. Alternatively, the server interface 252 requests all items associated with this user device. The server interface stores the obtained items in the item store 260. The schedule store 258 and the item store 260 may represent a single data structure or multiple data structures (databases, repositories, files, etc.) residing on one or more mass storage devices, such as magnetic or optical storage based disks, SSDs or hard drives.

In one embodiment, when delivery of an item is delayed, the schedule handling subsystem 200 notifies the scheduling agent 250 that the item is delayed via an IP notification or an SMS message, and provides a new delivery time for the delayed item or sends another notification when the delayed item is ready for delivery. In another embodiment, the exception monitor 256 is responsible for facilitating delivery of items that were not obtained by the server interface 258 due to a delayed delivery of an item to the item providing system 102 by content providers or any other delay in the availability of an item. In one embodiment, the item providing system 102 places a message in a queue specifying that a delivery of a specific item is delayed. In particular, the server interface 252 may obtain this message when contacting the item providing system 102 at a scheduled delivery time. The exception monitor 256 finds a modified delivery time for the delayed item in the message, and passes this modified delivery time to the delivery time monitor 254, which then initiates the download of the delayed item at the modified download time via the server interface 252. In another embodiment, the item providing system 102 does not provide a delay notification but rather the exception monitor 256 analyzes the items obtained by the server interface 252 at the last scheduled delivery time and identifies one or more items that have not been obtained by the server interface (contrary to the schedule). The exception monitor 256 then calculates a new delivery time for the delayed item content (e.g., 30 minutes after the initially scheduled download time), and passes this delivery time to the delivery time monitor 254, which then initiates the download of the delayed item at the specified delivery time via the server interface 252. In yet another embodiment, the exception monitor 256 uses a sequence of retry times (e.g., at predefined intervals) to attempt the download of a delayed item until performing the download of the item. Yet alternatively, a separate service is provided that handles processing of delayed items.

In one embodiment, the exception monitor 256 also facilitates delivery of items that were not obtained by the server interface 258 due to the offline mode of the user device (e.g., when the user was on an airplane). For example, the exception monitor 256 may detect that the mode of the user device has been changed from an offline mode to an online mode, and determine whether any delivery times specified in the schedule were missed while the user device was in the offline mode. If so, the exception monitor 256 invokes the server interface 252 to connect to the item providing system 102 and obtain the appropriate items. In one embodiment, only if the wireless connection was re-enabled due to a predefined event (e.g., if the user manually re-enables the wireless connection), the exception monitor 256 invokes the server interface 252 to connect to the item providing system 102 to see if there are any items in the queue waiting to be downloaded by the user device. Otherwise, if the wireless connection was re-enabled due to any other event (e.g., a user device has returned to an area covered by an access point), the exception monitor 256 ignores the delivery times missed while the user device was in the offline mode.

Figure 3:
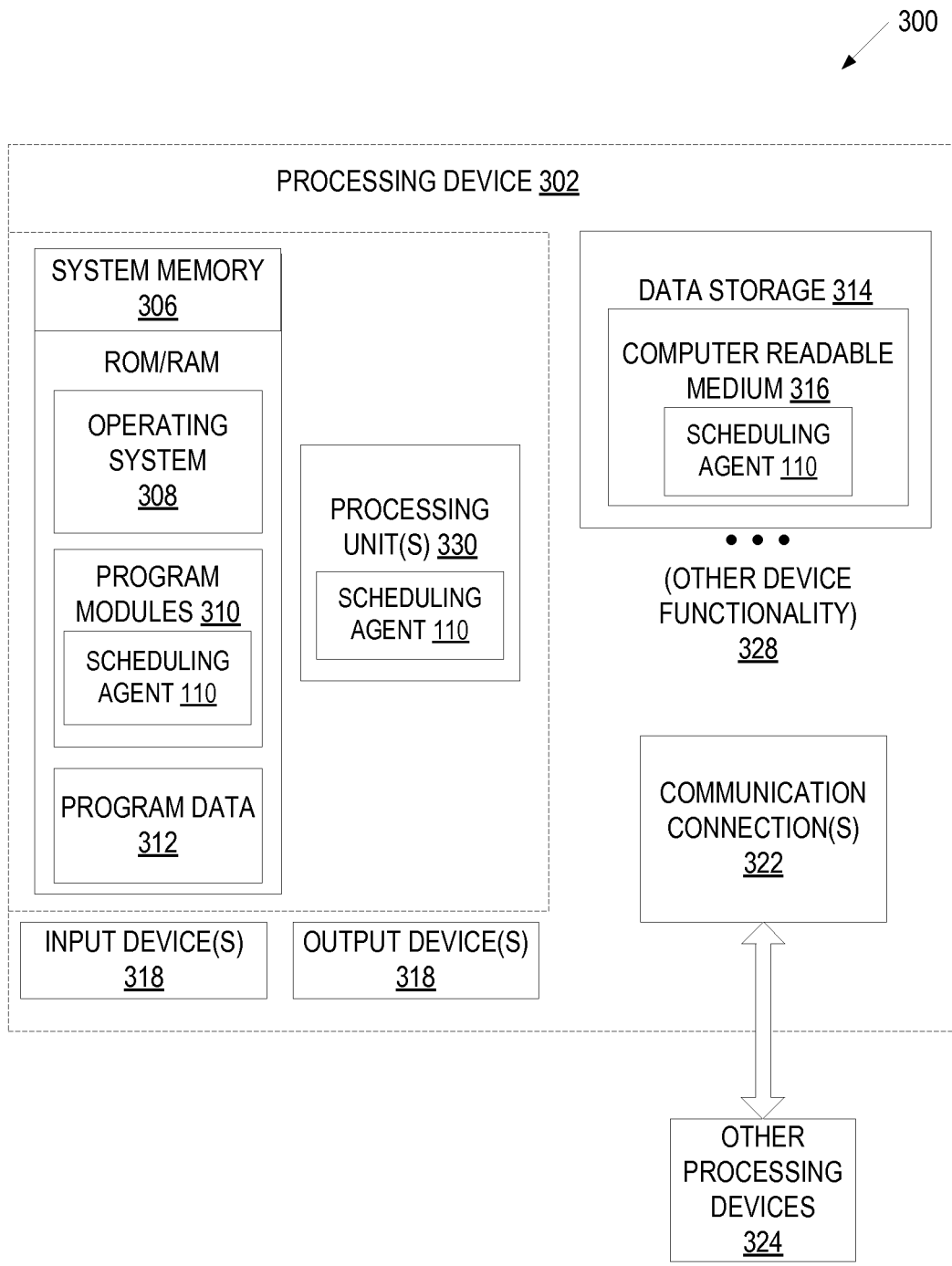
FIG. 3 is a block diagram illustrating an exemplary user device.

FIG. 3 is a block diagram illustrating an exemplary user device 300. The user device 300 may be the same as user device 106 of FIG. 1 and may be any type of computing device such as an electronic book reader, a PDA, a mobile phone, a laptop computer, a portable media player, a tablet computer, a camera, a video camera, a netbook, a desktop computer, a gaming console, a DVD player, a media center, and the like.

The user device 300 includes one or more processing units 304, such as one or more CPUs. The user device 300 also includes system memory 306, which may correspond to any combination of volatile and/or non-volatile storage mechanisms. The system memory 306 may store information which provides an operating system component 308, various program modules 310 including scheduling agent 110, program data 312, and/or other components. The user device 300 performs functions by using the processing unit(s) 304 to execute the scheduling agent 110 and other instructions provided by the system memory 306.

The user device 300 may also include a data storage device 314 that may consist of one or more types of removable storage and/or one or more types of non-removal storage. The data storage device 314 may include a computer-readable medium 316 on which is stored one or more sets of instructions (e.g., instructions of the scheduling agent 110) embodying any one or more of the methodologies or functions described herein. As shown, instructions of the scheduling agent 110 may also reside, completely or at least partially, within the system memory 306 and/or within the processing unit(s) 330 during execution thereof by the user device 300, the system memory 306 and the processing unit(s) 330 also constituting computer-readable media. The instructions of the scheduling agent 110 may further be transmitted or received over a network.

The user device 300 may also include one or more input devices 318 (keyboard, mouse device, specialized selection keys, etc.) and one or more output devices 320 (displays, printers, audio output mechanisms, etc.). The user device 300 may further include one or more communication interface mechanisms 322. These communication interface mechanisms 322 allow the user device 300 to interact with other processing devices 324, such as remote computers, the item providing system, and so forth. The communication interface mechanisms 322 may allow the user device 300 to receive an IP notification or an SMS message and also communicate with the item providing system in a data mode.

The above-enumerated list of modules is representative and is not exhaustive of the types of functions performed by the user device 300. As indicated by the label "Other Device Functionality" 328, the user device 300 may include additional functions.

FIGS. 4A, 4B, 4C, 5A, 5B, 6A, 6B, 6C, 7 and 8 illustrate server-based methods performed in accordance with various embodiments of the invention. The methods are performed by processing logic that may comprise hardware (circuitry, dedicated logic, etc.), software (such as is run on a general purpose computer system or a dedicated machine), or a combination of both. In one embodiment, the methods are performed by a server (e.g., item providing system 102 of FIG. 1).

Figure 4A:
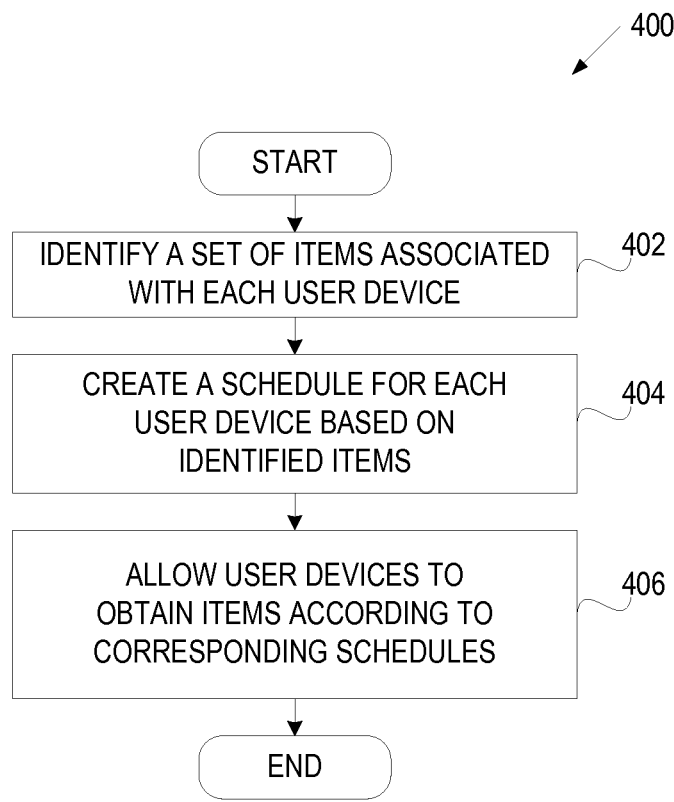
FIG. 4A is a flow diagram of one embodiment of a server-based method for scheduling communications between an item providing system and user devices.

FIG. 4A is a flow diagram of one embodiment of a server-based method 400 for scheduling communications between an item providing system and user devices. Method 400 begins with the item providing system identifying a set of items associated with each user device (block 402). Items may include any type of item for which predictable delivery is observable. Example of such items may include content items, software updates, instructions (e.g., instructions to download subscribed content items), files (e.g., log files) and messages (e.g., delayed delivery messages). Content items may include subscription materials (e.g., newspapers, magazines, news feeds, blog feeds, subscribed audio or video content such as podcasts) or non-subscription materials that can be ordered in advance (e.g., book club books, rental books, pre-ordered books, pre-ordered articles, pre-ordered audio books or articles, music albums, pre-ordered television episodes of a show, pre-ordered movies).

At block 404, the item providing system creates a schedule for each user device based on the identified items. Exemplary embodiments of a method for creating a schedule for a user device are discussed in more detail below in conjunction with FIGS. 5A and 5B.

At block 406, the item providing system allows user devices to obtain items according to corresponding schedules. Exemplary embodiments of a method for allowing a user device to obtain items according to a schedule of the user device are discussed in more detail below in conjunction with FIGS. 4B and 4C.

Figure 4B:
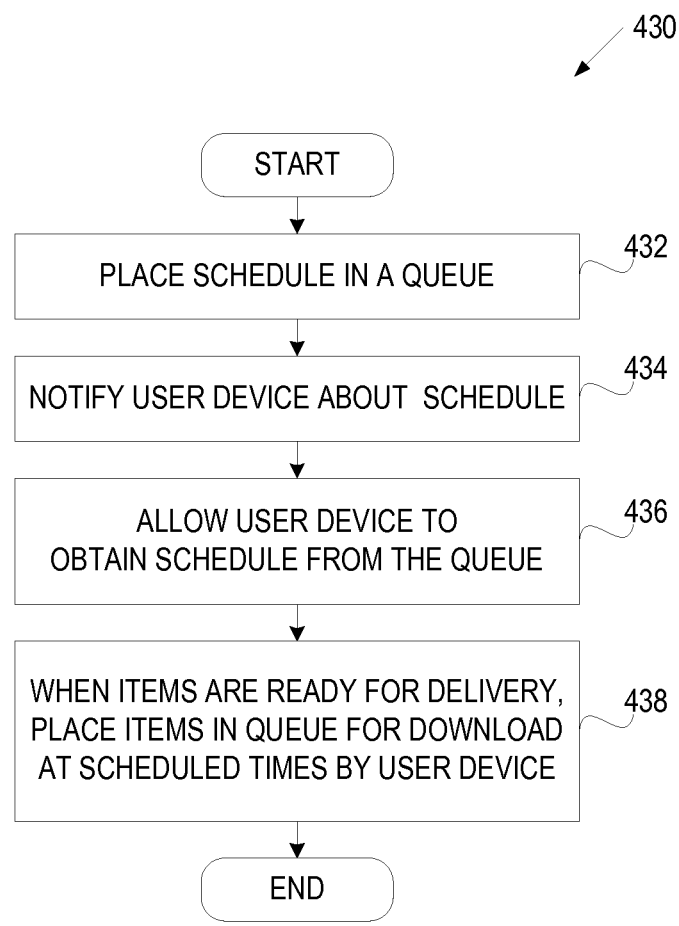
FIG. 4B is a flow diagram of one embodiment of a server-based method for allowing user devices to obtain items according to a schedule.

FIG. 4B is a flow diagram of one embodiment of a server-based method 430 for allowing a user device to obtain items according to a schedule of the user device. Method 430 begins with the item providing system placing a schedule for a user device in a queue (block 432). The schedule may be a new schedule for a user device or an updated schedule for a user device. At block 434, the item providing system notifies the user device about the schedule (e.g., via an IP notification or an SMS message). Alternatively, the item providing system does not notify the user device about the schedule; rather the user device will obtain the schedule next time it connects to the item providing system to obtain the items from the queue.

At block 436, the item providing system allows the user device to obtain a schedule from the queue (e.g., the user device may connect to the item providing system, request the schedule from the queue, and be provided with the requested schedule in response). At block 438, the item providing system processes items (after they were received from content providers or created at the item providing system) and places the items in the queue for delivery at the scheduled times to the user device.

Figure 4C:
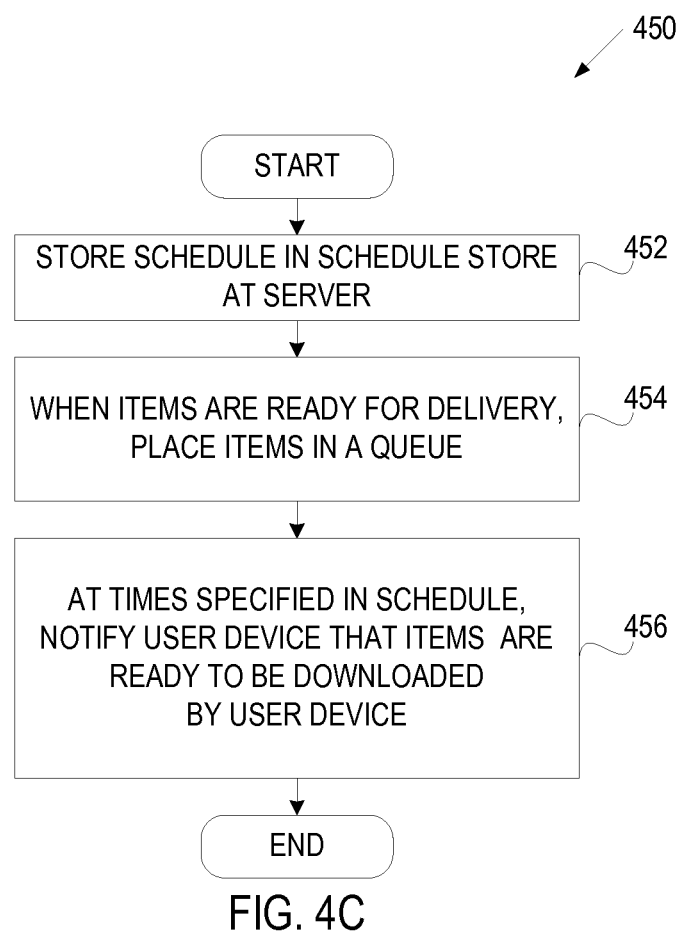
FIG. 4C is a flow diagram of an alternative embodiment of a server-based method for allowing user devices to obtain items according to a schedule.

FIG. 4C is a flow diagram of an alternative embodiment of a server-based method 450 for allowing a user device to obtain items according to a schedule. Method 450 begins with the item providing system storing a schedule of a user device in a schedule store of the item providing system (block 452). At block 454, the item providing system processes items received from content providers or created at the item providing system, and places the items in the queue. At block 456, the item providing system notifies the user device that the items are ready to be delivered to the user device.

Figure 5A:
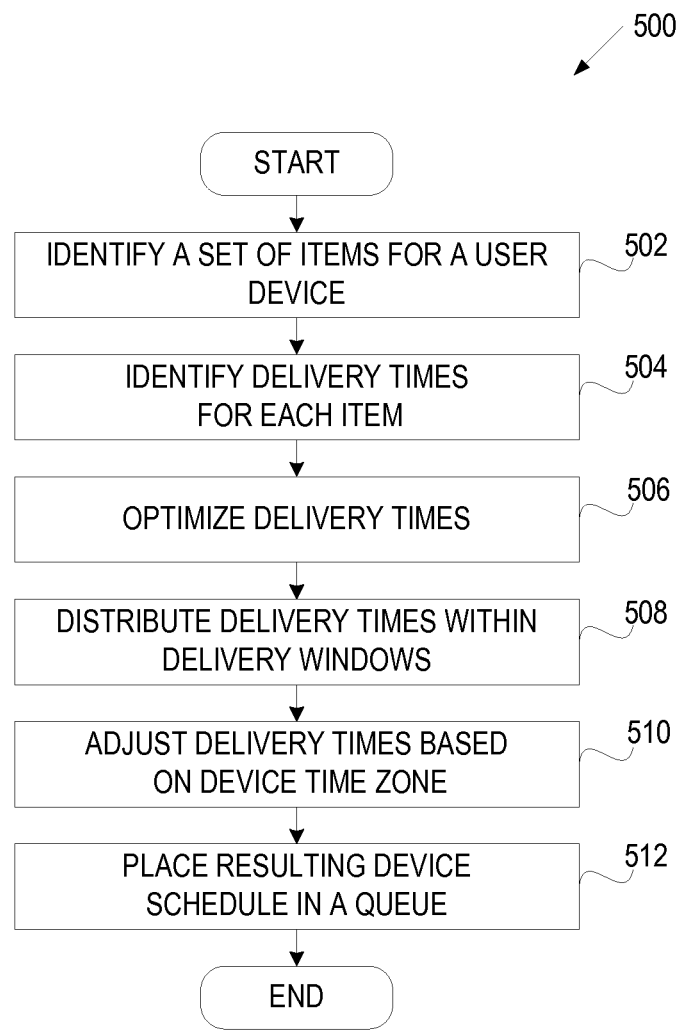
FIG. 5A is a flow diagram of one embodiment of a server-based method for creating a customized schedule for a user device.

FIG. 5A is a flow diagram of one embodiment of a server-based method 500 for creating a customized schedule for a user device. Method 500 begins with the item providing system identifying a set of items (e.g., subscriptions) associated with a user device (block 502). At block 504, the item providing system identifies a delivery time for each item. For example, a delivery time for a subscription can be determined based on the time when a subscribed item is scheduled to be received from a content provider (e.g., *The New York Times*) and an ingestion window for the subscribed item (e.g., an interval for converting the subscribed item to a format readable by user devices and/or other internal processing). At block 506, the item providing system performs an optimization phase for the set of delivery times identified at block 504. In one embodiment, the optimization phase includes combining subscriptions that have similar delivery times and then reducing the size of a resulting schedule if needed. The item providing system may reduce the schedule size by first determining whether the resulting set of delivery times for an item will result in a schedule size greater than a threshold. If not, the item providing system may end the optimization phase. If so, the item providing system may reduce the size of a schedule by adding one or more delivery times for the item to the schedule to simplify a representation of the schedule, which requires less space. For example, if an initial schedule includes deliveries on Monday, Tuesday, Wednesday, Thursday and Friday at 10 am ("call in on Monday, Tuesday, Wednesday, Thursday and Friday at 10 am), the initial schedule may be modified to add additional delivery times on Saturday and Sunday, thus resulting in a daily recurrence having a simpler representation ("call in every day at 10 am") and, as a result, a smaller schedule size. The item providing system may repeat the schedule size optimization until the size of the schedule is below a threshold.

At block 508, the item providing system identifies a delivery window for each delivery time resulting from the optimization phase of block 510, and then distributes delivery times within the delivery windows to ensure that different user devices request items from the queue at different times.

At block 510, the item providing system adjusts the resulting delivery times based on the time zone of the device. The item providing system may adjust the delivery time to ensure that the user device downloads an item before the delivery deadline of the item according to the local time of the user device. In addition, because the usage time of user devices are likely to vary with respect to the UTC time for user devices at different time zones, the item providing system can schedule an earlier delivery of an item to users who tend to turn on their devices at an earlier UTC time (e.g., users in New York are likely to turn on their user devices at an earlier UTC time than users in San Francisco; hence the delivery of item 1 to users in San Francisco can be at a later UTC time than the delivery of item 1 to users in New York).

At block 512, the item providing system places the resulting device schedule in the queue. In one embodiment, each user device has a separate queue. Alternatively, a queue is shared by multiple user devices.

Figure 5B:
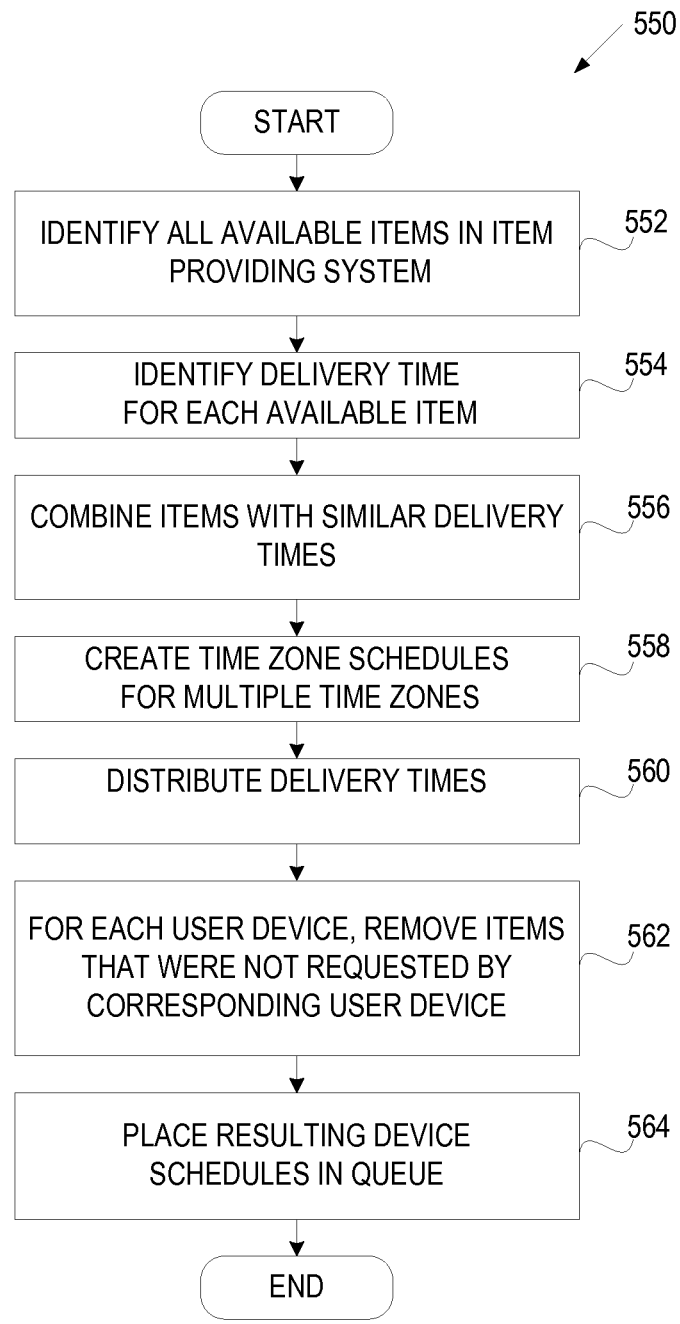
FIG. 5B is a flow diagram of another embodiment of a server-based method for creating a customized schedule for a user device.

FIG. 5B is a flow diagram of another embodiment of a server-based method 550 for creating a customized schedule for a user device. Method 550 begins with the item providing system identifying all items (e.g., subscriptions) available to users of the item providing system. At block 554, the item providing system identifies the delivery time for each available item. At block 556, the item providing system combines items with similar delivery times, optionally optimizes the size of resulting schedules as discussed above in conjunction with FIG. 5A, and identifies a delivery window for each resulting delivery time. The resulting delivery times and delivery windows represent a master schedule.

At block 558, the item providing system converts the master schedule into multiple time zone schedules based on various time zones. At block 560, the item providing system distributes delivery times within the delivery windows for different user devices. At block 562, the item providing system removes items that were not requested by a corresponding user device. At block 564, the item providing system places the resulting device schedule in the queue.

Figure 6A:
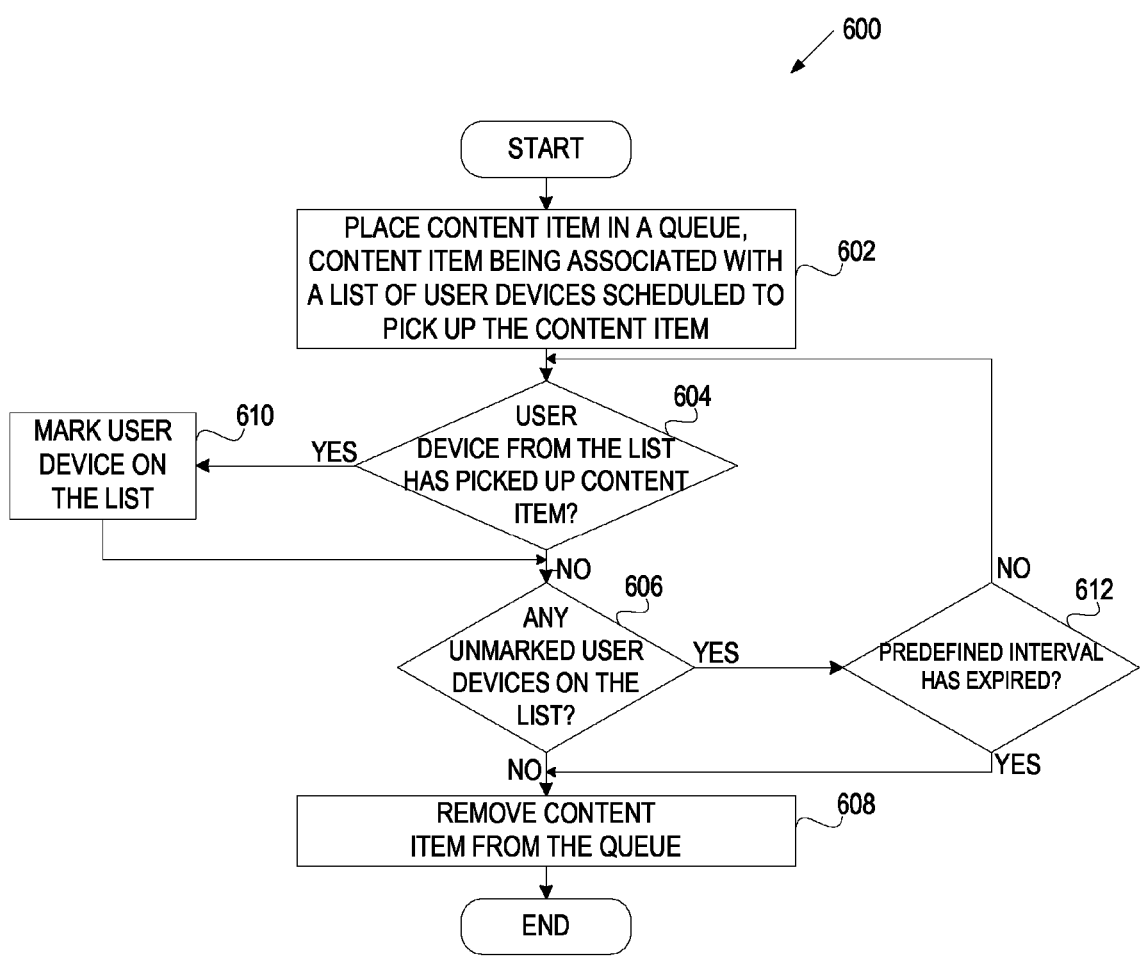
FIG. 6A is a flow diagram of one embodiment of a server-based method for maintaining a queue to hold items for multiple user devices.

FIG. 6A is a flow diagram of one embodiment of a server-based method 600 for maintaining a queue to hold items for multiple user devices. Method 600 begins with the item providing system placing an item in a queue (block 602). The item is associated with a list of user devices that are scheduled to obtain this item.

At block 604, the item providing system determines whether the item has been obtained by a user device from the list. If not, method 600 proceeds to block 606. If so, the item providing system marks the user device on the list (block 610) and then determines whether there are any unmarked user devices on the list (block 606).

If there are no more unmarked user devices on the list, then all relevant devices have already obtained this item, and the item providing system removes this item from the queue (block 608). Otherwise, if there are some relevant devices that have not yet obtained this item, the item providing system further determines whether a predefined time interval (a delivery window) for keeping the item in the queue has already expired (block 612). If the predefined time interval has not expired, method 600 returns to block 604. If the predefined time interval has expired, the item providing system removes the item from the queue (block 608).

In an alternative embodiment, the item providing system does not keep track of user devices that are obtaining a specific item from the queue. Rather, the item providing system keeps an item in the queue for a predefined time period and removes the item from the queue once the predefined time interval has expired.

Figure 6B:
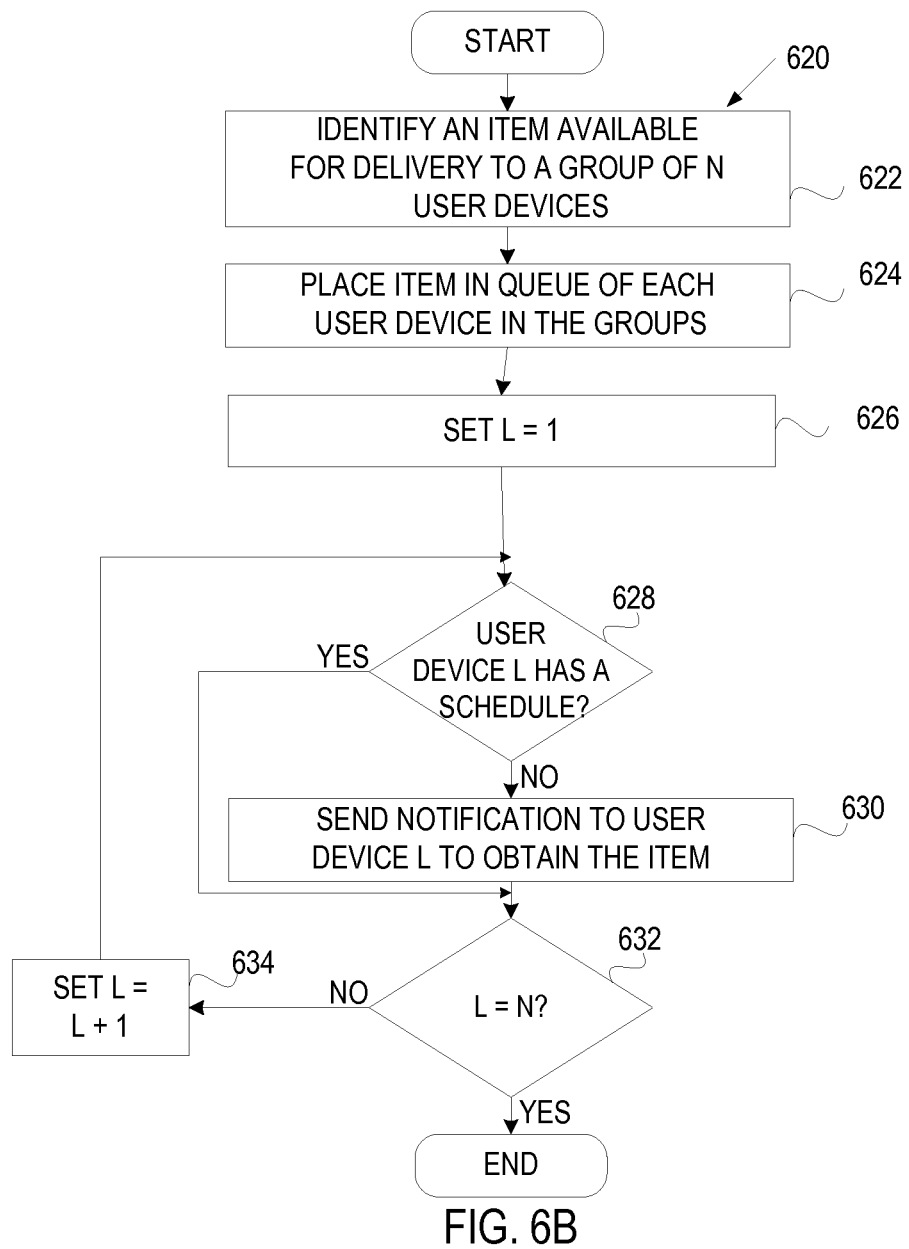
FIG. 6B is a flow diagram of one embodiment of a server-based method for maintaining a queue to hold items for a specific user device.

FIG. 6B is a flow diagram of one embodiment of a server-based method 620 for maintaining a queue to hold items for a specific user device. Method 620 begins with the item providing system identifying an item available for delivery and identifying a group of N user devices scheduled to obtain this item (block 622). In the embodiment of FIG. 6B, each user device has a separate queue to hold the items of that user device.

At block 624, the item providing system places the item in a queue of each user device. At block 626, the item providing system starts processing user devices from the group (in parallel or sequentially) starting with the first user device in the group (i.e., setting L to 1). At block 628, the item providing system determines whether user device L has a schedule. A user device may have a schedule if it has a capability to contact the item providing system at scheduled times (Wi-Fi capability) and/or has a scheduling agent installed on the device. The item providing system may determine whether user device L has a schedule based on data maintained in a user device store. In an alternative embodiment, the item providing system determines whether the user device L has a schedule that will instruct the user device to download the items soon (within a predefined time interval). The item providing system can make this determination by analyzing the schedule of the user device.

If user device L has a schedule, the method proceeds to block 632. If the user device does not have a schedule, the item providing system sends a notification (e.g., an IP notification or an SMS message) about the item to the user device (block 630).

At block 632, the item providing system determines whether user device L is the last one in the group. If so, method 620 ends. If not, the item providing system proceeds to the next device in the group by setting L to L+1 and returning to block 628.

Figure 6C:
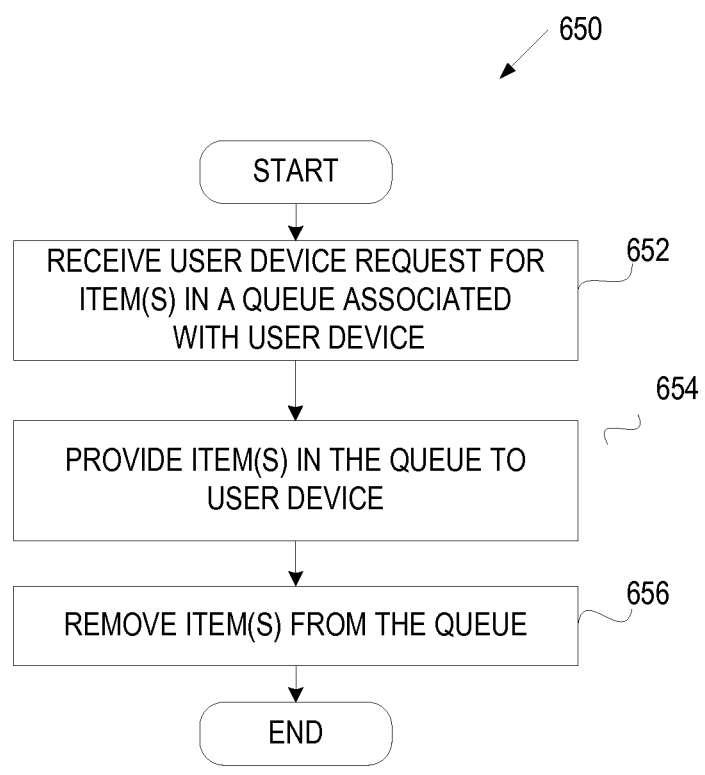
FIG. 6C is a flow diagram of one embodiment of a server-based method for removing items from a device-specific queue.

FIG. 6C is a flow diagram of one embodiment of a server-based method 650 for removing items from a device-specific queue. Method 650 begins with the item providing system receiving a request from a user device for one or more items in a queue associated with a user device (block 652). At block 654, the item providing system provides the item(s) to the user device (for download or copying). At block 656, the item providing system removes the item(s) obtained by the user device from the queue.

Figure 7:
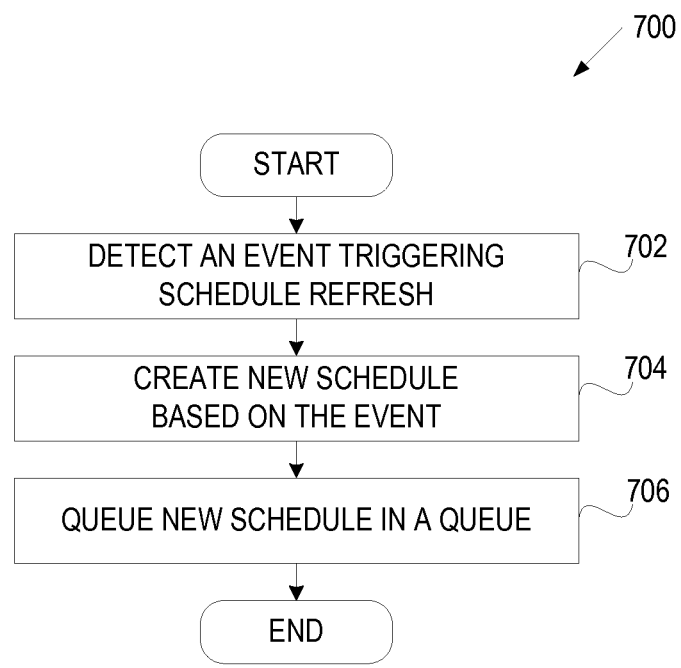
FIG. 7 is a flow diagram of one embodiment of a server-based method for refreshing a schedule of a user device.

FIG. 7 is a flow diagram of one embodiment of a server-based method 700 for refreshing a schedule of a user device. Method 700 begins with the item providing system detecting an event triggering a schedule refresh. Such an event may be a request to add a new item (e.g., a new subscription) to the set of items associated with this user device, a request to cancel one of the user device's subscriptions, a change of the time zone of the user device, a change of a delivery time of an existing item to the item providing system by an external source, a change in the behavior of a user of the user device, etc.

At block 704, the item providing system creates a new schedule based on the event. At block 706, the item providing system places the new schedule in the queue. In one embodiment, prior to placing the schedule in the queue, the item providing system checks whether the new schedule is different from the schedule that the user device currently has. The item providing system may then notify the user device that the new schedule is ready for download or may wait for the user device to contact the item providing system and download the items from the queue.

Figure 8:
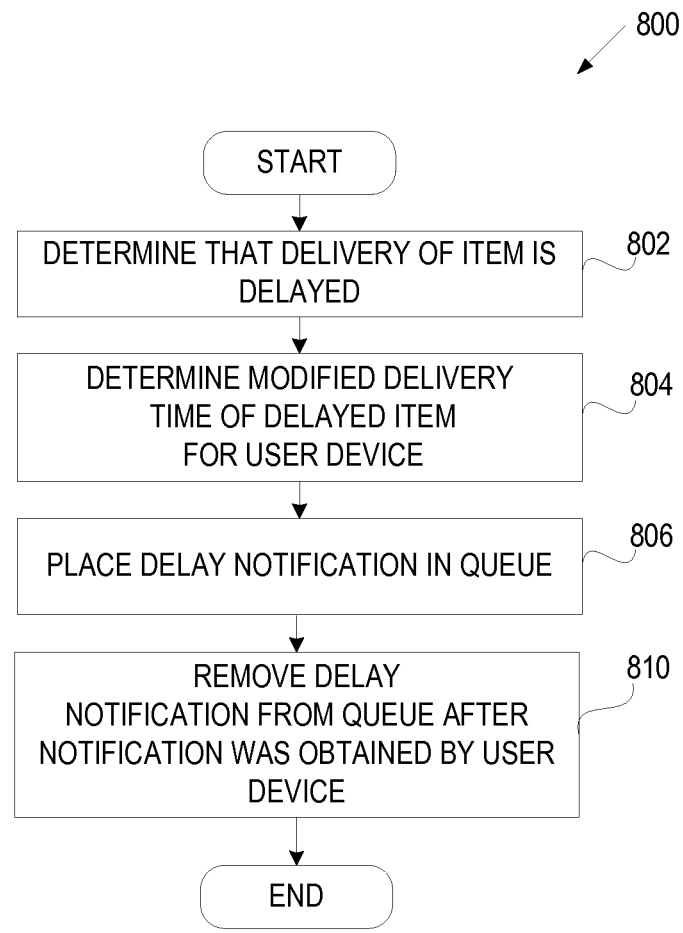
FIG. 8 is a flow diagram of one embodiment of a server-based method for handling a late delivery of an item.

FIG. 8 is a flow diagram of one embodiment of a server-based method 800 for handling a late delivery of an item. Method 800 begins with the item providing system determining that there will be a delay in having an item ready for delivery (e.g., based on a notification received from a content provider) (block 802). At block 804, the item providing system determines a new delivery time for the delayed item (e.g., based on a delay specified by the content provider and the original delivery time for this item in the schedule of the user device).

At block 806, the item providing system places a delay notification in the queue. At block 808, the item providing system removes the delay notification from the queue (e.g., after the user device downloads the delay notification or a predefined time interval has expired) (block 810). In another embodiment, the item providing system removes the delay notification from the queue after the user device downloads a corresponding item.

In an alternative embodiment, the item providing system does not notify a user device about the delay. Instead, the user device determines that a scheduled item was not provided (contrary to the schedule) and attempts to download the item at a later time (e.g., the user device can make one or more attempts to obtain a delayed item).

Figure 9A:
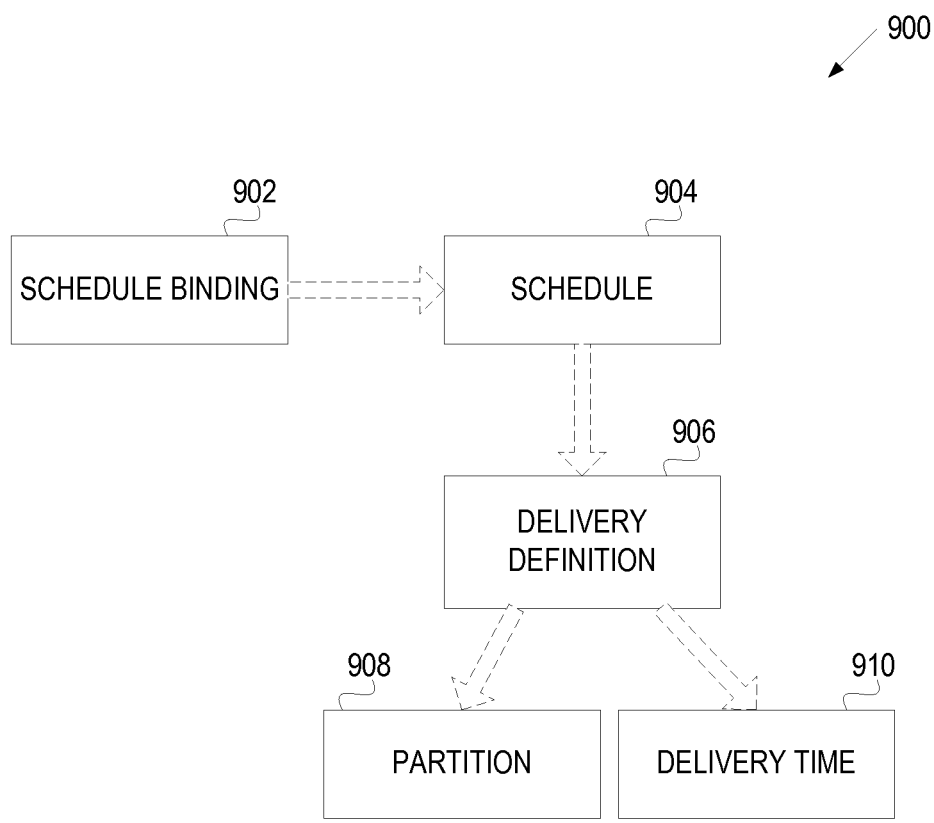
FIG. 9A illustrates an exemplary data model for a schedule, in accordance with one embodiment of the invention.

FIG. 9A illustrates an exemplary logical data model 900 for a schedule, in accordance with one embodiment of the invention. According to the data model 900, an item may be associated with multiple schedules. A schedule may be a named schedule that indicates a recurring time window which can be optionally partitioned by time zone. The data model includes a table 904 for specifying schedules and a table 902 for specifying items and binding schedules to items (using a schedule name or ID as a foreign key). A schedule may be based on one or more delivery definitions 906, with each delivery definition 906 having a recurring delivery time 910 and an optional partition 908 on time zone.

Figure 9B:
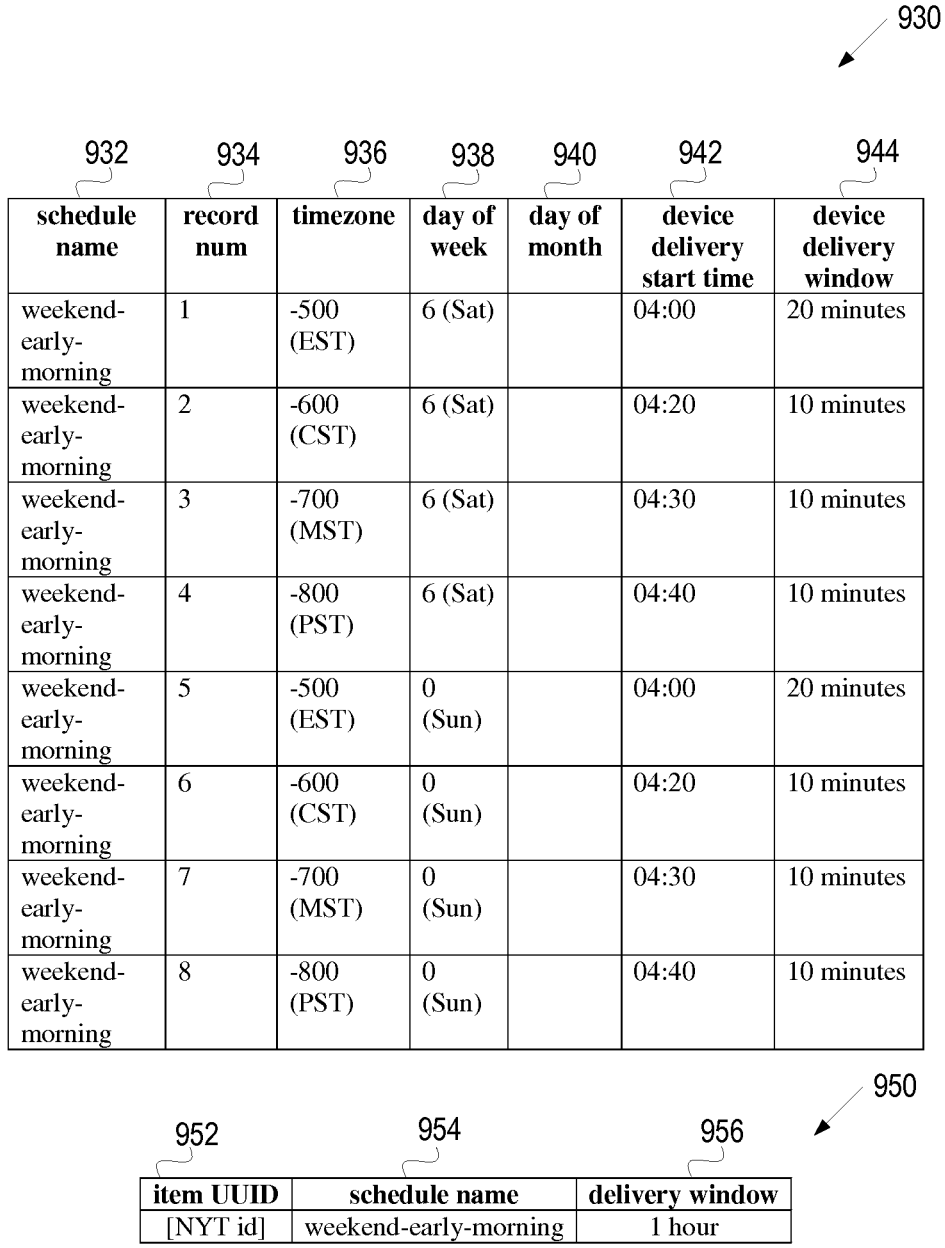
FIG. 9B illustrates exemplary schedule data populated using a data model of FIG. 9A in accordance with one embodiment of the invention.

FIG. 9B illustrates exemplary data of a schedule table 930 and a schedule binding table 950 that are populated using a data model of FIG. 9A in accordance with one embodiment of the invention. The schedule table 930, which is an example of table 904, may include a schedule name 932, a unique record number 934, a time zone 936, a day of a week 938, a day of a month 940, a delivery start time (randomized delivery time for a user device) 942, and a delivery window 944. The schedule binding table 950, which is an example of table 902, may include a universal unique ID (UUID) of an item (e.g., The New York Times), a schedule name matching the schedule name 932 of table 930, and a delivery window for the item.

FIGS. 10A, 10B, 11 and 12 illustrate client-based methods performed in accordance with various embodiments of the invention. The methods are performed by processing logic that may comprise hardware (circuitry, dedicated logic, etc.), software (such as is run on a general purpose computer system or a dedicated machine), or a combination of both. In one embodiment, the methods are performed by a client (e.g., user device 106 of FIG. 1).

Figure 10A:
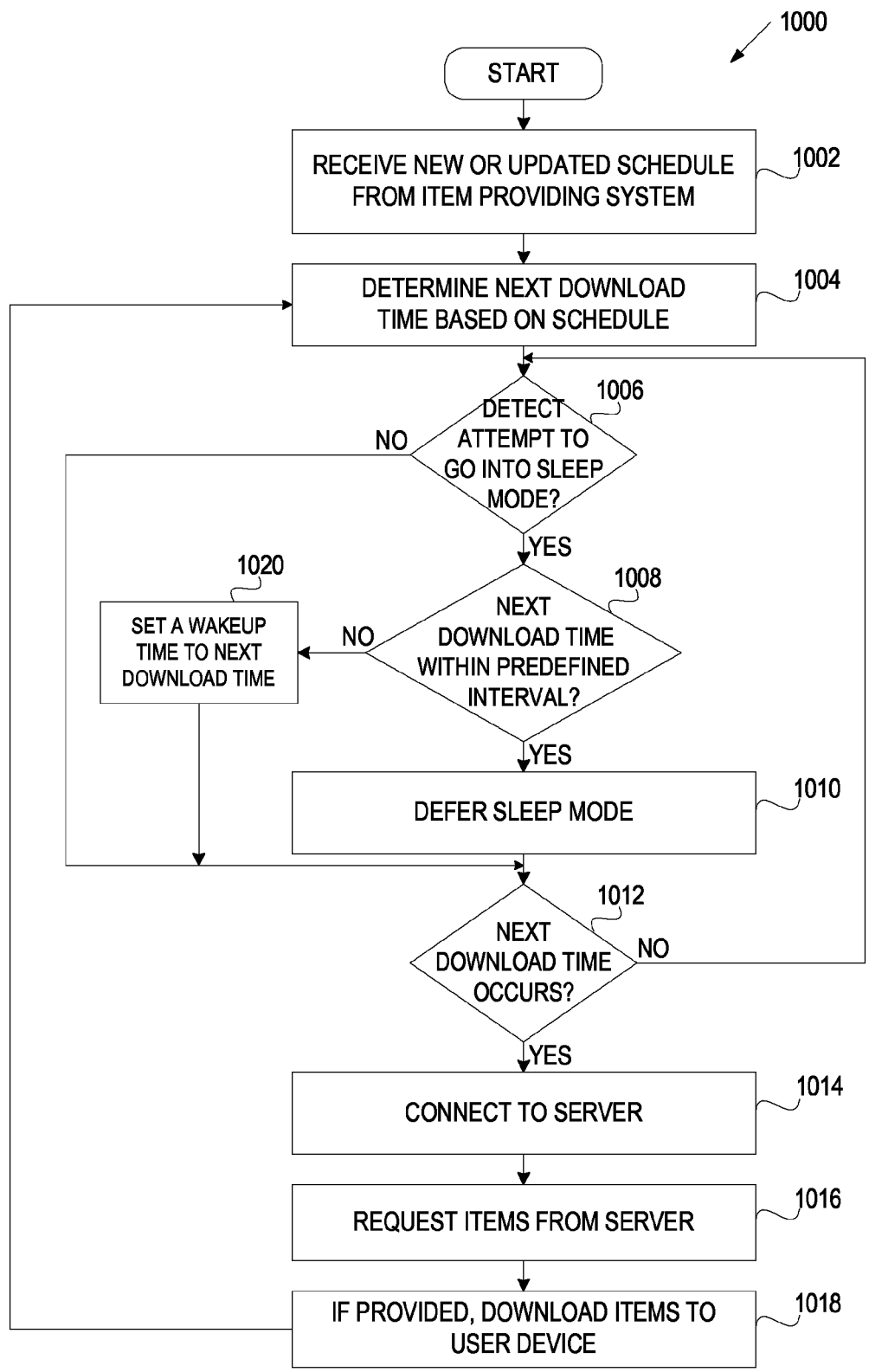
FIG. 10A is a flow diagram of one embodiment of a client-based method for obtaining items in accordance with a schedule for a user device.

FIG. 10A is a flow diagram of one embodiment of a client-based method 1000 for obtaining items in accordance with a schedule of a user device. Method 1000 begins with the user device receiving a new or updated schedule from a server (e.g., an item providing system) (block 1002). At block 1004, the user device determines the next download time (also referred to herein as delivery time) using the schedule. In one embodiment, the user device determines the next download time not only when the user receives a new or updated schedule but also each time the user device obtains items such as delay notifications and other instructions from the item providing system. One embodiment of a method for determining the next download time will be discussed in more detail below in conjunction with FIG. 10B.

If the next download time is not occurring too soon and a user is not interacting with the user device, the user device may switch to a "sleep" mode. If the user device does not detect an attempt to switch to a sleep mode prior to the next download time, the method proceeds to block 1012. If the user device detects an attempt to switch to a sleep mode (block 1006), the user device determines whether the next download time is scheduled to occur within a predefined time interval (block 1008). If so, the user device defers the sleep mode until after the next download time (block 1010) and the method proceeds to block 1012. If not, the user device sets a wakeup time to the next download time (or slightly before the next download time) and allows the switch to the sleep mode (block 1020).

At block 1012, the user device determines whether the next download time has occurred. If not, the method returns to block 1006. If so, the user device connects to the server (block 1014) and requests items from the server (block 1016). In one embodiment, the user device requests specific items that are identified in the schedule (e.g., by an item UUID). Alternatively, the user device asks for any items that are associated with the user device. At block 1018, if the items are provided, the user device downloads the items. If the provided items include instructions to obtain digital content (e.g., subscribed content), the user device downloads or copies the digital content to a local store. The user device then returns to block 1004 to determine the next delivery time. In one embodiment, this determination is performed each time the user device downloads one or more items from the server. In another embodiment, this determination is performed only if the user device downloads a specific item from the server. Such a specific item can be a new or updated schedule, a delay notification or any other instruction.

Figure 10B:
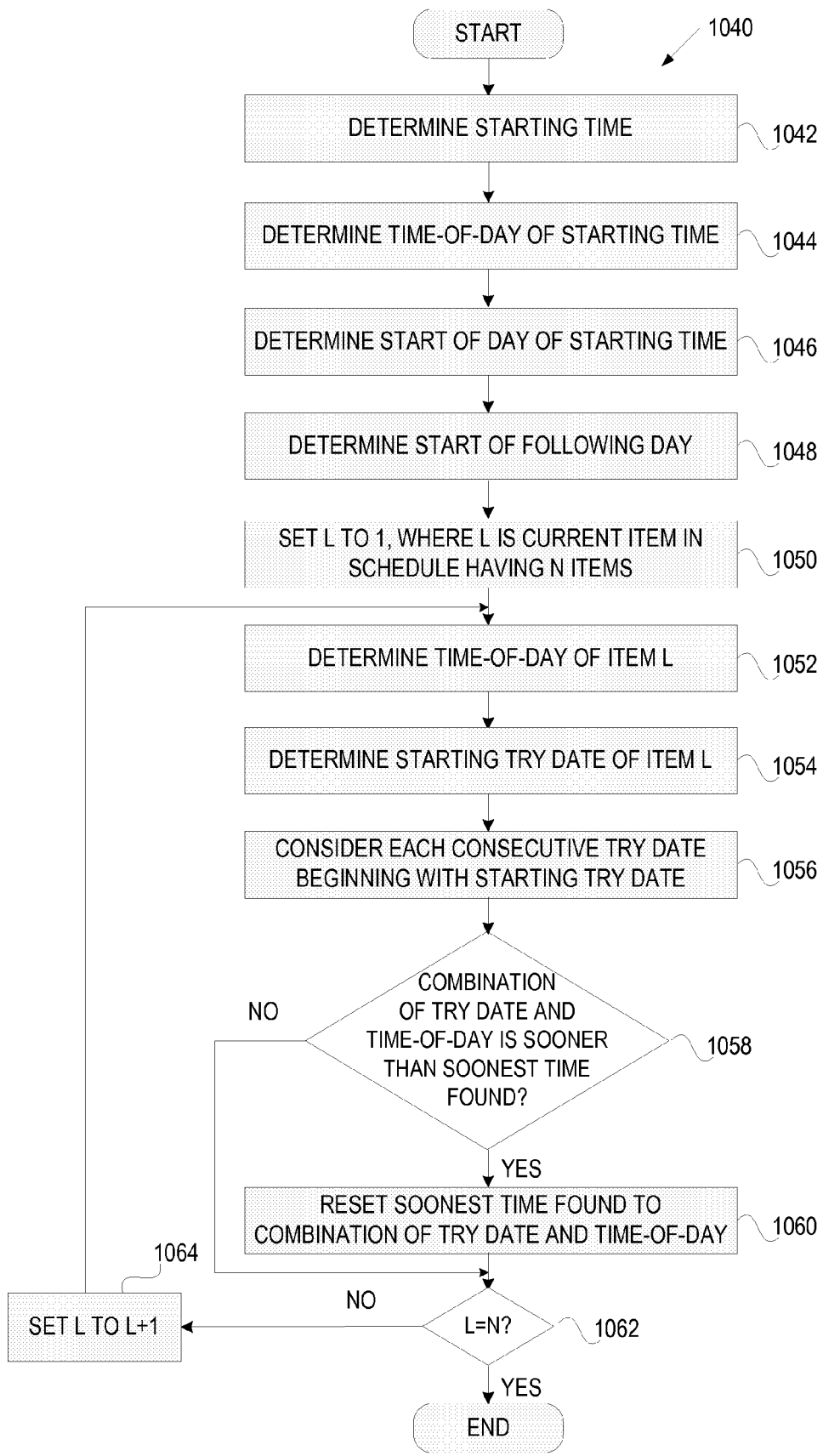
FIG. 10B is a flow diagram of one embodiment of a client-based method for determining the next download time based on a schedule.

FIG. 10B is a flow diagram of one embodiment of a client-based method 1040 for determining the next delivery time based on a schedule of a user device. Method 1040 begins with the user device determining the starting time (block 1042). The starting time may be the present time or the time of the last contact with the server. At block 1044, the user device determines the time-of-day of the starting time (i.e., the number of seconds since midnight). At block 1046, the user device determines the start of the day of the starting time (i.e., 12:00 am on that day). At block 1048, the user device determines the start of the following day (i.e., the first occurrence of 12:00 am following the starting time).

Next, the user device processes each individual item L in the schedule, where every combination of day and time represents an individual item L in the schedule, and the number of such individual items in the schedule is equal to N. At block 1050, the user device sets L to 1. At block 1052, the user device determines the time-of-day of the schedule item. At block 1054, the user device determines the starting "try date". The starting try date can be the start of the day of the starting time if the time-of-day of the schedule item is later than the time-of-day of the starting time. Otherwise, the starting try date is the start of the following day.

At block 1056, the user device considers each consecutive try date (day), beginning with the starting try date. In particular, the user device first checks whether the schedule item specifies a day of the week that matches the current try date. If not, then user device checks whether the schedule item specifies a day of the month that matches the current try date. If one of these two conditions is satisfied, the user device uses the starting try date determined at block 1054. Otherwise, if none of these two conditions are satisfied, the user device changes the try date to the following day, and checks again whether any of the above two conditions are satisfied. The user device can repeat the checking until at least one of the two conditions is satisfied. In an alternative embodiment, the user device does not perform the above loop, but rather computes the future day by determining what the current day is and what days the schedule item specifies, as opposed to testing each consecutive day.

At block 1058, the user device determines whether the resulting combination of the try date and the time-of-day (i.e., the time-of-day specified by the schedule item, on the try date where block 1056 stopped) is sooner than the soonest time found so far. If the determination made at block 1058 is positive, the user device resets the soonest time found so far to the aforementioned resulting combination (block 1060) and method 1040 proceeds to block 1062. Otherwise, method 1040 proceeds directly to block 1062.

At block 1062, the user device determines whether the current item L is the last item in the schedule (i.e., whether L is equal to N). If so, method 1040 ends. If not, the user device moves to the next item in the schedule by incrementing L by 1 and moving to block 1052.

Figure 11:
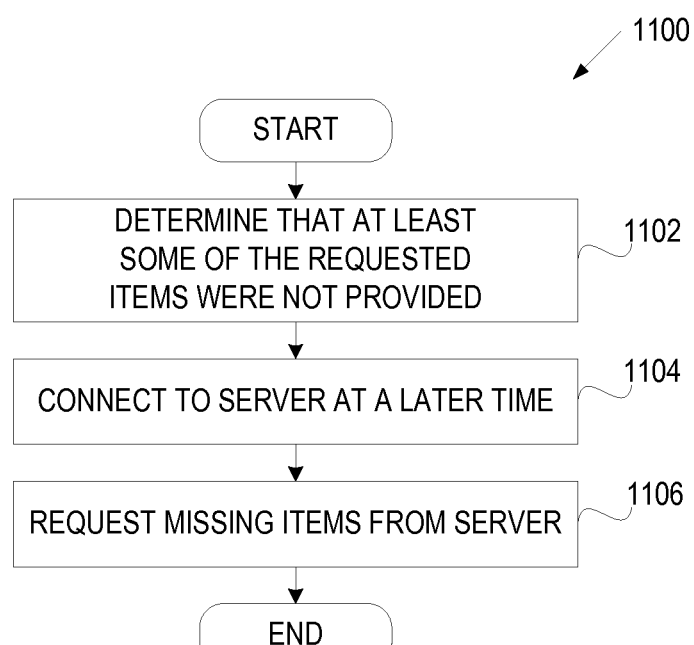
FIG. 11 is a flow diagram of one embodiment of a client-based method for obtaining delayed items.

FIG. 11 is a flow diagram of one embodiment of a client-based method 1100 for obtaining delayed items. Method 1100 begins with the user device determining that at least some of the scheduled items were not provided by the server (block 1102). The user device can make this determination by receiving from the server a delay notification instead of a scheduled item. Alternatively, the user device can make this determination by analyzing data received from the server and determining that the scheduled item is missing from the received data.

At block 1104, the user device connects to the server at a later time. The new time may be specified in the delay notification received from the server. Alternatively, the user device may calculate the new time or a series of new times using a predefined offset (e.g., 30 minutes from an initial time in the schedule) and/or various other factors such as the battery level of the user device, the behavior pattern of the user, etc.). At block 1106, the user device requests a missing item(s) from the server. In one embodiment, the user device makes one or more such attempts to obtain missing items from the server.

Figure 12:
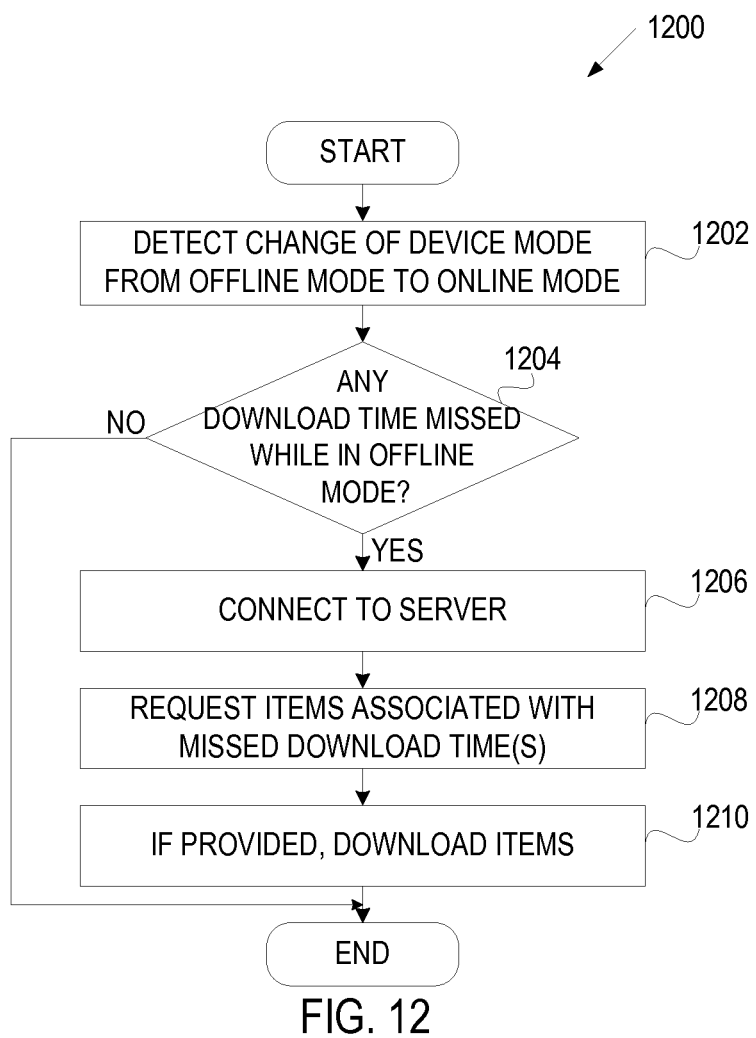
FIG. 12 is a flow diagram of one embodiment of a client-based method for obtaining items missed due to an offline mode of a user device.

FIG. 12 is a flow diagram of one embodiment of a client-based method 1200 for obtaining items missed due to an offline mode of a user device. Method 1200 begins with the user device detecting that the user device mode has changed from an offline mode to an online mode (e.g., when the user manually re-enables the online mode or the user device has returned to an area covered by an access point) (block 1202). At block 1204, the user device determines whether any download times from the schedule were missed while the user device was in the offline mode. If not, method 1200 ends. If so, the user device connects to the server (block 1206) and requests items associated with the missed download time(s) (block 1208). At block 1210, if the server provides the items, the user device stores these items in a local store.

In some embodiments, the user device connects to the server after the user device mode has changed to the online mode only if such a change was caused by a predefined event. If such a change was caused by a different event, the user device ignores the download times that occurred while the user device was in the offline mode. For example, the user device may connect to the server to download missing items after the user manually re-enables the online mode but the user device may ignore the missing items if the offline mode was caused by the user device's location in an area not covered by an access point.

Figure 13:
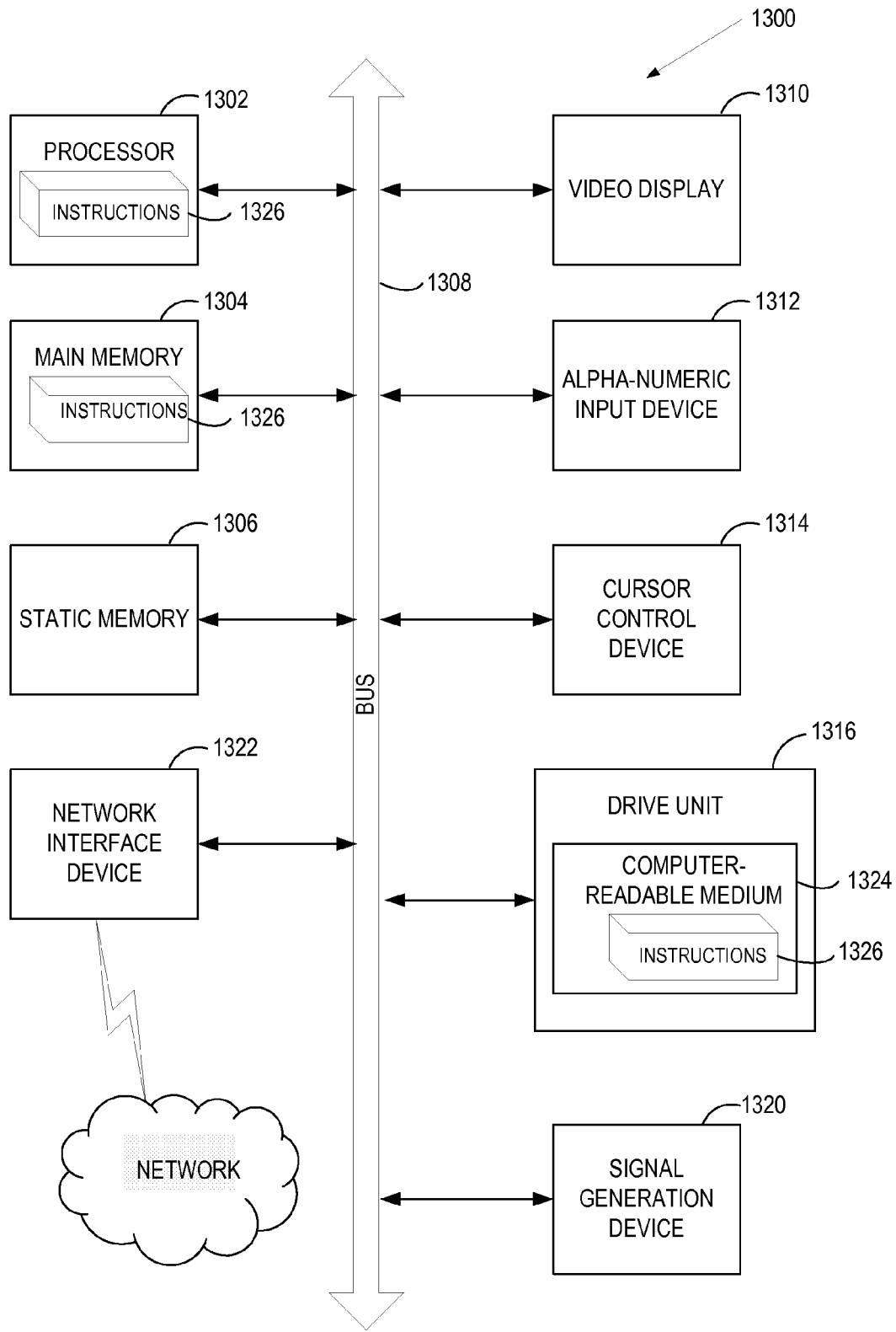
FIG. 13 illustrates an exemplary item providing system.

FIG. 13 illustrates an exemplary item providing system 1300 in the form of a computer system within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1300 includes a processing system (processor) 1302, a main memory 1304 (e.g., read-only memory (ROM), flash memory, dynamic random access memory (DRAM) such as synchronous DRAM (SDRAM)), a static memory 1306 (e.g., flash memory, static random access memory (SRAM)), and a data storage device 1316, which communicate with each other via a bus 1306.

Processor 1302 represents one or more general-purpose processing devices such as a microprocessor, central processing unit, or the like. More particularly, the processor 1302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1302 may also be one or more special-purpose processing devices such as an application specific integrated circuit (ASIC), a field programmable gate array (FPGA), a digital signal processor (DSP), network processor, or the like. The processor 1302 is configured to execute the schedule handling subsystem 108 for performing the operations and steps discussed herein.

The computer system 1300 may further include a network interface device 1322. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1320 (e.g., a speaker).

A drive unit 1316 may include a computer-readable medium 1324 on which is stored one or more sets of instructions (e.g., instructions of schedule handling subsystem 108) embodying any one or more of the methodologies or functions described herein. The instructions of the schedule handling subsystem 108 may also reside, completely or at least partially, within the main memory 1304 and/or within the processor 1302 during execution thereof by the computer system 1300, the main memory 1304 and the processor 1302 also constituting computer-readable media. The instructions of the schedule handling subsystem 108 may further be transmitted or received over a network via the network interface device 1322.

While the computer-readable storage medium 1324 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying", "creating", "notifying", "allowing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a processing device of a user device from a server, a schedule;
   determining, by the processing device, a next delivery time of an item using the schedule upon occurrence of an event comprising at least one of receipt of a new schedule, receipt of an updated schedule, or download of an instruction item from the server;
   detecting a first attempt by the user device to switch to a sleep mode;
   determining that the next delivery time is within a defined time interval from a time at which the first attempt to switch to the sleep mode is detected;
   deferring the sleep mode until after the next delivery time; and
   contacting, by the processing device at the next delivery time, the server to request the item from the server in accordance with the schedule.

2. The method of claim 1, wherein receiving the schedule comprises:
   receiving, from the server, a notification that the schedule is ready to be delivered to the user device;
   contacting the server to request the schedule from a queue; and
   storing the schedule in a local data store.

3. The method of claim 1, wherein contacting the server to request the item comprises:
   at the next delivery time,
   connecting to the server;
   requesting the item; and
   receiving the item from the server.

4. The method of claim 3, further comprising:
   detecting a second attempt by the user device to switch to a sleep mode;
   determining that the next delivery time is not within a predefined time interval from a time at which the second attempt to switch to the sleep mode is detected; and
   setting a wakeup time of the user device to the next delivery time and allowing the user device to switch to the sleep mode.

5. The method of claim 1, further comprising:
   identifying at least one item that has not been provided by the server at a scheduled delivery time; and
   initiating a communication with the server at a time later than the scheduled delivery time to request the at least one item.

6. The method of claim 1, wherein contacting the server to request the one or more items from the server comprises:
   receiving a notification message indicating a late delivery of the at least one item; and
   contacting the server at a time later than a scheduled delivery time to request the at least one item.

7. The method of claim 6, wherein the notification message includes a new delivery time for the at least one item, the method further comprising contacting, by the user device, the server at or after the new delivery time.

8. The method of claim 1, further comprising:
   determining that a device mode of the user device is changed from an offline mode to an online mode;
   determining that the user device was in the offline mode during at least one delivery time; and
   contacting the server to obtain one or more items associated with the at least one delivery time.

9. A user device comprising:
   a memory;
   a processing device operatively coupled to the memory, the processing device to:
   receive, from a server, a schedule;
   determine a next delivery time for an item using the schedule upon occurrence of a predefined event, the predefined event comprising at least one of receipt of a new schedule, receipt of an updated schedule, or download of an instruction item from the server;
   detect an attempt by the user device to switch to a sleep mode;
   determine that the next delivery time is not within a defined time interval from a time at which the attempt to switch to the sleep mode is detected;
   set a wakeup time of the device to the next delivery time and allow the user device to switch to the sleep mode; and
   contact the server at the next delivery time to request the item from the server.

10. The user device of claim 9, wherein the processing device is further to:
    identify at least one item that has not been provided by the server at a scheduled delivery time; and
    initiate a communication with the server at a time later than the scheduled delivery time to request the at least one item.

11. The user device of claim 9, wherein the processing device is further to:

receive a notification message indicating a late delivery of at least one item when contacting the server to request the item; and contact the server at a time later than the scheduled delivery time to request the at least one item.

12. The user device of claim 9, wherein the processing device is further to:

determine that the user device has missed at least one delivery time while in an offline mode; and contact the server to obtain one or more items associated with the missed delivery time.

13. A non-transitory computer-readable medium having instruction encoded thereon which, when executed by a processing device of a user device, cause the processing device to perform operations comprising:

receiving, by the processing device from a server, a schedule;

determining, by the processing device, a next delivery time of an item using the upon occurrence of a predefined event, the predefined event comprising at least one of receipt of a new schedule, receipt of an updated schedule, or download of an instruction item from the server;

detecting a first attempt by the user device to switch to a sleep mode;

determining that the next delivery time is within a defined time interval from a time at which the first attempt to switch to the sleep mode is detected;

deferring the sleep mode until after the next delivery time; and contacting, by the processing device at the next delivery time, the server to request the item from the server in accordance with the schedule.

14. The non-transitory computer-readable medium of claim 13, the operations further comprising:

detecting a second attempt by the user device to switch to a sleep mode;

determining that the next delivery time is not within a predefined time interval from a time at which the second attempt to switch to the sleep mode is detected; and setting a wakeup time of the user device to the next delivery time and allowing the user device to switch to the sleep mode.

15. The non-transitory computer-readable medium of claim 13, the operations further comprising:

determining that the user device was in an offline mode during at least one delivery time; and contacting the server to obtain one or more items associated with the at least one delivery time.

16. The non-transitory computer-readable medium of claim 13, wherein receiving the schedule comprises:

receiving, from the server, a notification that the schedule is ready to be delivered to the user device;

contacting the server to request the schedule from a queue; and storing the schedule in a local data store.

17. The non-transitory computer-readable medium of claim 13, wherein contacting the server to request the item comprises:

at the next delivery time,
connecting to the server;
requesting the item and
requesting the item from the server.

* * * * *